US012579173B2

(12) United States Patent
Agarwal et al.

(10) Patent No.: US 12,579,173 B2
(45) Date of Patent: Mar. 17, 2026

(54) SYSTEMS AND METHODS FOR DYNAMICALLY PROVIDING INTELLIGENT RESPONSES

(71) Applicant: ACCENTURE GLOBAL SOLUTIONS LIMITED, Dublin (IE)

(72) Inventors: Asit Agarwal, Bengaluru (IN); Praveen Kumar Matt Rajashekar, Bengaluru (IN); Harish Lm, Bengaluru (IN); Swathi V, Bengaluru (IN); Thilagavathi Indrajit, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 623 days.

(21) Appl. No.: 18/094,032

(22) Filed: Jan. 6, 2023

(65) Prior Publication Data

US 2024/0232238 A1 Jul. 11, 2024

(51) Int. Cl.
*G06F 16/3329* (2025.01)
*G06F 16/3332* (2025.01)
*G06F 40/247* (2020.01)

(52) U.S. Cl.
CPC ...... *G06F 16/3329* (2019.01); *G06F 16/3335* (2019.01); *G06F 40/247* (2020.01)

(58) Field of Classification Search
CPC . G06F 16/3329; G06F 16/3335; G06F 40/247
See application file for complete search history.

(56) References Cited

U.S. PATENT DOCUMENTS

| | | | |
|---|---|---|---|
| 9,916,829 B2 * | 3/2018 | Beckford | G10L 15/22 |
| 11,593,359 B1 * | 2/2023 | Singhal | G06F 16/248 |
| 2016/0019556 A1 * | 1/2016 | Mazniker | G06Q 30/0201 |
| | | | 705/7.29 |
| 2017/0262449 A1 * | 9/2017 | Venkataraman | G06N 20/00 |
| 2018/0096057 A1 * | 4/2018 | Zheng | G06F 16/35 |
| 2018/0173808 A1 * | 6/2018 | Sharma | G06F 16/9535 |

(Continued)

OTHER PUBLICATIONS

Azure-MicroSoft. "Event Grid-Event Handler", downloaded from the Internet on Jan. 4, 2023, 8 pages.

(Continued)

*Primary Examiner* — Athar N Pasha
(74) *Attorney, Agent, or Firm* — Mannava & Kang, P.C

(57) ABSTRACT

Systems and methods for providing dynamic responses to a user query are disclosed herein. A system receives a message request from a computing device, and generates an intent associated with the message request based on a pre-processing of the message request. Further, the system concurrently transmits a query to a database for a prestored response to the message request based on the generated intent, and the generated intent to a knowledge source searcher. The knowledge source searcher asynchronously queries one or more knowledge sources for a predicted response to the message request. Furthermore, the system receives the prestored response from the database and the predicted response from the knowledge source searcher, determines a response to the message request, from at least one of the prestored response and the predicted response, based on a scoring model, and transmits the determined response to the computing device.

20 Claims, 14 Drawing Sheets

100

(56) References Cited

U.S. PATENT DOCUMENTS

| | | | | |
|---|---|---|---|---|
| 2020/0137000 A1* | 4/2020 | Wu | ........................ | G06F 40/295 |
| 2020/0287976 A1* | 9/2020 | Theogaraj | ............... | H04L 47/28 |
| 2021/0390144 A1* | 12/2021 | B M S | ................... | G06N 20/00 |
| 2022/0059088 A1* | 2/2022 | Lee | ........................... | G06N 3/08 |

OTHER PUBLICATIONS

Microsoft, "What is Azure Event Grid?", Jun. 9, 2022, 7 pages.
Philipp Muns, "EventBridge Use Cases and Examples", Jul. 30, 2019, 7 pages.
Romin Irani, "Google Cloud Functions Tutorial: Writing Background Functions", Apr. 24, 2018, 21 pages.

* cited by examiner

100

200

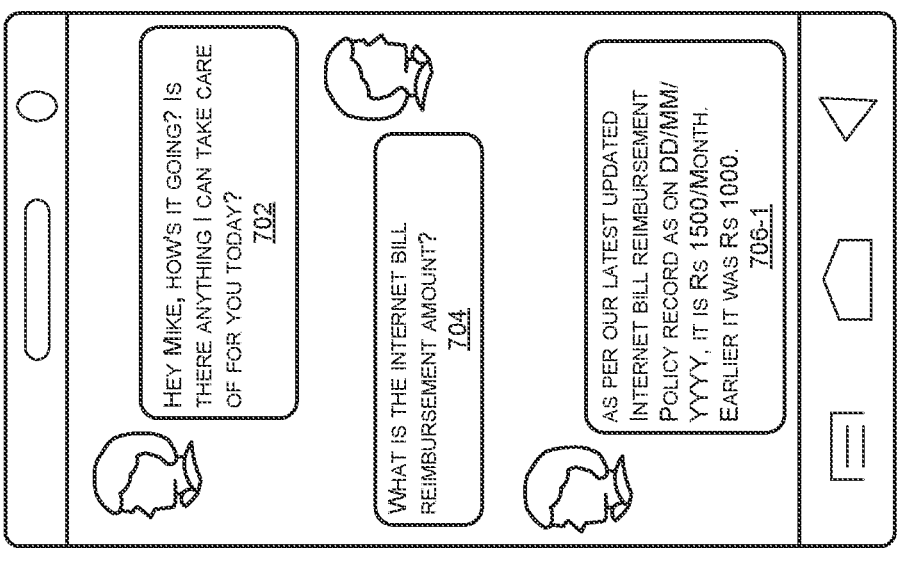

HEY MIKE, HOW'S IT GOING? IS THERE ANYTHING I CAN TAKE CARE OF FOR YOU TODAY? 702

WHAT IS THE INTERNET BILL REIMBURSEMENT AMOUNT? 704

AS PER OUR LATEST UPDATED INTERNET BILL REIMBURSEMENT POLICY RECORD AS ON DD/MM/YYYY, IT IS Rs 1500/MONTH. EARLIER IT WAS Rs 1000. 706-1

HEY MIKE, HOW'S IT GOING? IS THERE ANYTHING I CAN TAKE CARE OF FOR YOU TODAY? 702

WHAT IS THE INTERNET BILL REIMBURSEMENT AMOUNT? 704

AS PER OUR INTERNET BILL REIMBURSEMENT POLICY, IT IS Rs 1000/MONTH. 706

FIG. 7A

SYSTEMS AND METHODS FOR DYNAMICALLY PROVIDING INTELLIGENT RESPONSES

BACKGROUND

A chatbot is a computer program or software designed to engage in a conversation with a user via textual or auditory means. In recent years, chatbot technology using artificial intelligence (AI) has been increasingly popular. Given the increased usage of smartphones and mobile applications, the usage of chatbot in client applications has also grown significantly.

AI systems and methods are employed in various applications, including chatbots for implementing natural language processing, and other such applications. Such applications often require efficient time-saving algorithms that can readily provide accurate responses to user queries. Accordingly, AI-based chatbots are becoming increasingly prevalent in various scenarios.

Chatbots may be configured to converse with users using natural dialogues and may provide information from different data sources. However, existing chatbots might not stay up-to-date (e.g., with the latest information from data sources). Further, existing AI-based chatbots may provide relatively generic responses to user queries, which often do not solve or precisely answer user questions. In addition, the response time may increase with the addition of multiple data sources. Also, the complexity of search may increase depending on the type and size of data source. Furthermore, data sources may not be dynamically responsive in existing chatbots.

There is, therefore, a need for systems and methods for addressing at least the above-mentioned problems in existing systems.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system including a processor, and a memory coupled to the processor. The memory includes processor-executable instructions, which on execution, cause the processor to receive a message request from a computing device and generate an intent associated with the message request based on a pre-processing of the message request. Further, the processor may concurrently transmit a query to a database for a prestored response to the message request based on the generated intent, and the generated intent to a knowledge source searcher. The knowledge source searcher asynchronously queries one or more knowledge sources for a predicted response to the message request. Furthermore, the processor may receive, based on the concurrent transmission, the prestored response from the database and the predicted response from the knowledge source searcher. Additionally, the processor may determine a response to the message request, from at least one of the prestored response and the predicted response, based on a scoring model, and transmit the determined response to the computing device.

In an example embodiment, the scoring model calculates a score associated with a knowledge source for the prestored response, and a knowledge source for the predicted response. In an example embodiment, the processor may determine the response by comparison of the scores associated with each of the prestored response and the predicted response, selection of a candidate response having a highest score among the scores associated with each of the prestored response and the predicted response, and transmission of the candidate response as the determined response to the computing device.

In an example embodiment, the message request corresponds to a conversation initiated by a user using the computing device. In an example embodiment, the pre-processing of the message request to generate the intent includes at least one of: generating keywords by removing stop words from the message request and generating synonyms for the keywords.

In an example embodiment, the database includes a number of prestored intents. For each of the number of prestored intents, the database includes a prestored response, a knowledge source of the one or more knowledge sources associated with the prestored response, and a score associated with the knowledge source.

In an example embodiment, the scoring model computes a prediction score for each of the one or more knowledge sources, and a feedback score based on a feedback from a user of the computing device.

In an example embodiment, the processor may dynamically update the database based on at least one of the predicted response and the determined response. In an example embodiment, the processor may dynamically update the score associated with the candidate response in the database. In an example embodiment, the processor may dynamically update the database for each message request received from a user of the computing device.

In an example embodiment, a prediction score is associated with the predicted response based on a natural language processing model. In an example embodiment, the processor may receive the prediction score associated with the predicted response from the knowledge source searcher, and dynamically update the database based on the predicted response and the prediction score.

In an example embodiment, an update of information stored in the one or more knowledge sources causes the processor to query the database for a first tag associated with the updated information, transmit the first tag to the knowledge source searcher to obtain a predicted response and a prediction score for the first tag from each of the one or more knowledge sources, receive the predicted response and the prediction score for the first tag, and dynamically update the database based on the received predicted response and the prediction score for the first tag.

In another aspect, the present disclosure relates to a method for providing intelligent responses dynamically. The method includes receiving, by a processor, a message request from a computing device, generating, by the processor, an intent associated with the message request based on pre-processing the message request, concurrently transmitting, by the processor, a query to a database for a prestored response to the message request based on the generated intent, and the generated intent to a knowledge source searcher. The knowledge source searcher asynchronously queries one or more knowledge sources for a predicted response to the message request. Further, the method includes based on concurrently transmitting, receiving, by the processor, the prestored response from the database and the predicted response from the knowledge source searcher, and determining, by the processor, a response to the message request, from at least one of the prestored response and the predicted response, based on a score associated with a knowledge source for the prestored response, and a knowledge source for the predicted response. The method further includes determining the response by comparing, by the processor, the scores associated with the prestored response and the predicted response, and selecting, by the processor, a candidate response having a highest score among the scores associated with each of the prestored response and the predicted response. Furthermore, the method includes transmitting, by the processor, the candidate response as the determined response to the computing device.

In another aspect, the present disclosure relates to a non-transitory computer-readable medium comprising machine-readable instructions that are executable by a processor to perform the steps of the method described herein.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIGS. 7A-7B illustrate example representations of a conversation between a user and a chatbot implementation of the disclosed systems, in accordance with embodiments of the present disclosure.

Figure 1:
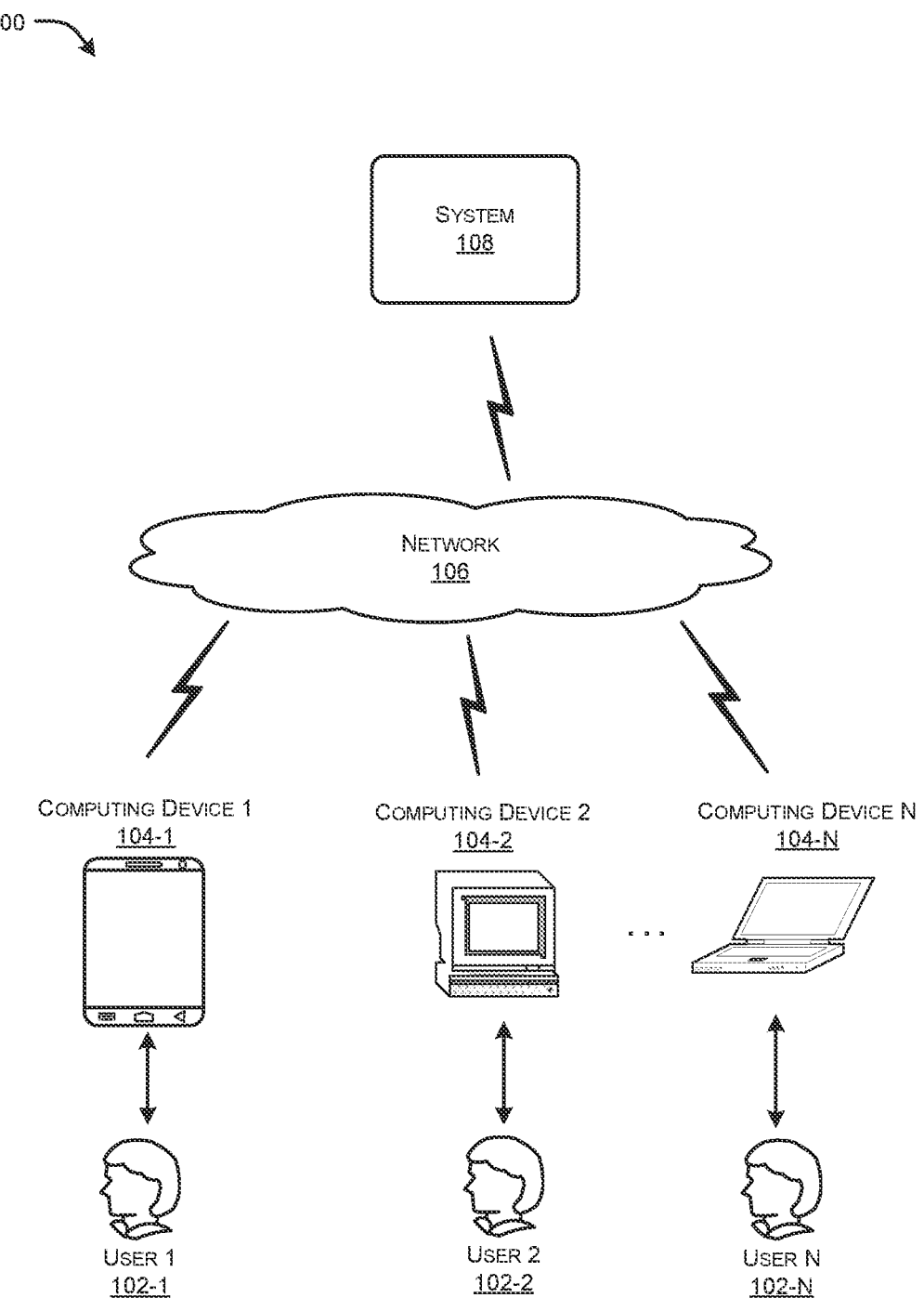
FIG. 1 illustrates an operating environment of a network architecture for implementing a system for providing intelligent responses dynamically, in accordance with embodiments of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides an intelligent manager built upon artificial intelligence and/or machine language predictions. In particular, the intelligent manager dynamically updates a database with the latest information from data sources. Further, the intelligent manager builds a scoring model based on which intelligent responses are provided to user queries dynamically.

In particular, the present disclosure describes a system, i.e. an intelligent manager, for providing dynamic responses to a user query. As an initial step, the system may receive a message request, i.e., a user query, from a computing device associated with a user. In an example embodiment, the message request may correspond to a conversation initiated by the user using the computing device.

The system may generate an intent and/or tags associated with the message request based on a pre-processing of the message request. In an example embodiment, the system may generate keywords by removing stop words from the message request. Alternatively, or additionally, the system may generate synonyms for the keywords.

The system may send a query to a database for a candidate response to the message request based on the generated intent and/or the tags. In an example embodiment, the system may send a query to the database for a pre-stored response to the message request. In an example embodiment, the database may include a number of intents and/or tags. For each of the number of intents and/or tags, the database may include a response that may have been previously answered or provided to a user. Further, the database may include a knowledge source associated with the response and a score associated with the knowledge source.

Further, the system may concurrently send the generated intent and/or tags to a knowledge source searcher. The knowledge source searcher may asynchronously query one or more configured knowledge sources for a predicted response to the message request.

Based on the concurrent transmission, the system may receive a pre-stored response from the database. Alternatively, or additionally, the system may receive a predicted response from the knowledge source searcher. In an example embodiment, the one or more configured knowledge sources may provide a predicted response to the message request to the knowledge source searcher.

The system may determine the candidate response to the message request from among the pre-stored response and the predicted response. In an example embodiment, the system may determine the candidate response to the message request based on a scoring model. In an example embodiment, the system may determine a score associated with the knowledge source for the pre-stored response based on the scoring model. Additionally, or alternatively, the system may determine a score associated with a knowledge source for the predicted response based on the scoring model. In an example embodiment, the scoring model may compute a prediction score for each of the one or more configured knowledge sources. The prediction score may be associated with the predicted response provided by the one or more configured knowledge sources. Alternatively, or additionally, the scoring model may compute a feedback score for a response based on a feedback from the user of the computing device.

In an example embodiment, the system may compare the scores associated with each of the pre-stored response (for example, the knowledge source of the pre-stored response) and the predicted response (for example, the knowledge source of the predicted response). In an example embodiment, the system may select the candidate response having the highest score out of all the scores associated with each of the pre-stored response and the predicted response. The system may send the candidate response to the computing device. In an example embodiment, the candidate response may include, but not be limited to, the predicted response and the pre-stored response.

In an example embodiment, the system may dynamically update the database based on the predicted response received from the one or more knowledge sources through the knowledge source searcher. Alternatively, or additionally, the system may dynamically update the database based on the determined response provided to the computing device. In an example embodiment, the system may dynamically update the score associated with the candidate response stored in the database. It should be understood that the system may dynamically update the database for each message request received from the user of the computing device.

In an example embodiment, if there is an update of information stored in the one or more knowledge sources, the system may send a query to the database to check for an intent and/or tag associated with the updated information. The system may send the intent and/or tag to the database to determine if the intent and/or tag associated with the updated information exist in the database. If the intent and/or tag do not exist in the database, the system may ignore the updated information. If the intent and/or tag exist in the database, the system may dynamically update the database with the updated information received from the one or more configured knowledge sources.

Therefore, the present disclosure discloses an intelligent manager or system to provide dynamic responses to a user query based on a scoring model. In particular, the intelligent manager or system facilitates dynamic update feature in a database with known and/or unknown intent and tags along with a score for each knowledge source. This feature helps in reducing the response time of the intelligent manager or system, and at the same time, updates the database in the background making the system more dynamic and responsive in nature.

The various embodiments throughout the disclosure will be explained in more detail with reference to FIGS. 1-11.

FIG. 1 illustrates an example operating environment or a network architecture 100 in which a system 108 such as an intelligent manager may be implemented for providing intelligent responses dynamically, in accordance with embodiments of the present disclosure.

In this embodiment, the network architecture 100 may include one or more computing devices (104-1, 104-2 . . . 104-N) operated by one or more users (102-1, 102-2 . . . 102-N). A person of ordinary skill in the art will appreciate that the one or more computing devices (104-1, 104-2 . . . 104-N) may be collectively referred as computing devices 104 and individually referred as computing device 104. A person of ordinary skill in the art will understand that there can be any number of computing devices 104 in the network architecture 100. Similarly, a person of ordinary skill in the art will understand that the one or more users (102-1, 102-2 . . . 102-N) may be collectively referred as users 102 and individually referred as user 102.

In an example embodiment, the computing device 104 may refer to a wireless device and/or a user equipment (UE). It should be understood that the terms "computing device," "wireless device," and "user equipment (UE)" may be used interchangeably throughout the disclosure.

A wireless device or the UE may include, but not limited to, a handheld wireless communication device (e.g., a mobile phone, a smart phone, a phablet device, and so on), a wearable computer device (e.g., a head-mounted display computer device, a head-mounted camera device, a wrist-watch computer device, and so on), a Global Positioning System (GPS) device, a laptop computer, a tablet computer, or another type of portable computer, a media playing device, a portable gaming system, and/or any other type of computer device with wireless communication capabilities, and the like. In an example embodiment, the computing devices 104 may communicate with the system 108 via a set of executable instructions residing on any operating system. In an example embodiment, the computing devices 104 may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the computing device 104 may include one or more in-built or externally coupled accessories including, but not limited to, a visual aid device such as camera, audio aid, a microphone, a keyboard, input devices for receiving input from the user 102 such as touch pad, touch enabled screen, electronic pen and the like.

A person of ordinary skill in the art will appreciate that the computing devices 104 may not be restricted to the mentioned devices and various other devices may be used.

Referring to FIG. 1, the system 108 may be communicatively coupled to the computing devices 104 via a network 106. In an example embodiment, the system 108 may communicate with the computing devices 104 in a secure manner via the network 106. The network 106 may include, by way of example, but not limited to, at least a portion of one or more networks having one or more nodes that transmit, receive, forward, generate, buffer, store, route, switch, process, or a combination thereof, etc. one or more messages, packets, signals, some combination thereof, or so forth. The network 106 may also include, by way of example, but not limited to, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fibre optic network, or some combination thereof. In particular, the network 106 may be any network over which the user 102 communicates with the system 108 using their respective computing devices (e.g., computing devices 104).

Referring to FIG. 1, the system 108 may be implemented by way of a single device or a combination of multiple devices that may be operatively connected or networked together. The system 108 may be implemented in a hardware or a suitable combination of hardware and software. In another example embodiment, the system 108 may be implemented as a cloud computing device or any other device that is network connected. In an example embodiment, the system 108 may implement artificial intelligence (AI) and machine learning (ML) prediction algorithm to provide dynamic and accurate responses to user queries in a timely manner, and thus, reducing the response time.

Referring to FIG. 1, the computing device 104 may store and execute a client side application that presents, to the user 102, one or more user interfaces. The client side application may interact with a server side application or the system 108. In an example embodiment, the computing device 104 may display a webpage of a website hosted by the system 108. The present disclosure proposes a system (e.g., 108) that responds accurately and timely in any use case or exemplary scenario where there is a requirement for a user query to be responded through an interface or otherwise.

In an example embodiment, the user 102 may post a query or initiate a conversation with the system 108 using the computing device 104. As an example, the user 102 may want to order food from a food delivery service associated with the system 108, and post a query related to a particular selection (e.g., pizza). In such an example, the system 108 may intelligently provide responses relevant to the user query (i.e., pizza in this case), in a manner which is explained in more detail throughout the disclosure.

Although FIG. 1 shows exemplary components of the network architecture 100, in other embodiments, the network architecture 100 may include fewer components, different components, differently arranged components, or additional functional components than depicted in FIG. 1. Additionally, or alternatively, one or more components of the network architecture 100 may perform functions described as being performed by one or more other components of the network architecture 100.

Figure 2:
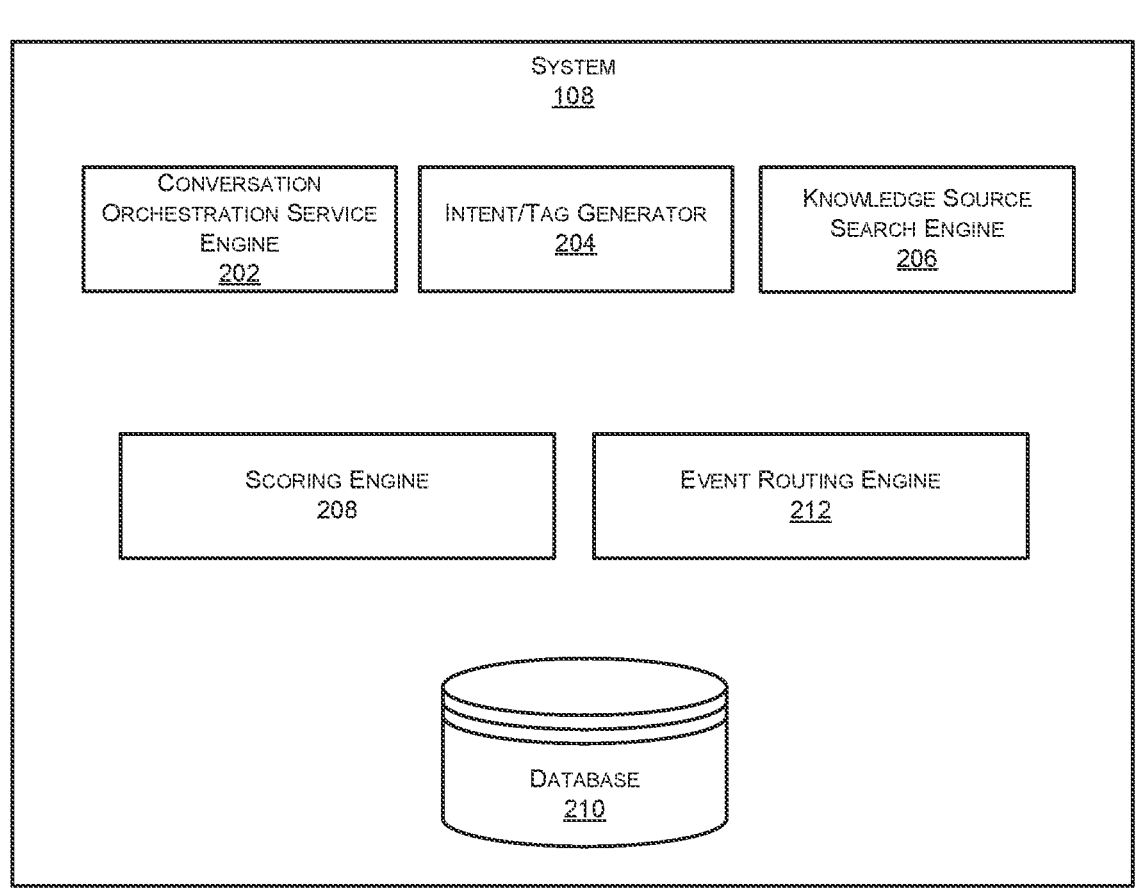
FIG. 2 illustrates an example block diagram of an intelligent manager, in accordance with embodiments of the present disclosure.

FIG. 2 illustrates an example block diagram 200 of a proposed system 108 such as an intelligent manager, in accordance with embodiments of the present disclosure. It may be appreciated that the system 108 of FIG. 2 may be similar to the system 108 of FIG. 1 in its functionality.

Referring to FIG. 2, the system 108 may include a conversation orchestration service engine 202, an intent and tag generator 204, a knowledge source search engine 206, a scoring engine 208, a database 210, and an event routing engine 212.

Conversation Orchestration Service Engine 202

Referring to FIG. 2, the conversation orchestration service engine 202 may refer to an artificial intelligence (AI) engine that facilitates integration of all the entities of the system 108. In an example embodiment, the conversation orchestration service engine 202 may securely manage connections and route messages between the system 108 and computing devices such as the computing devices 104 of FIG. 1. In an example embodiment, the conversation orchestration service engine 202 may execute operational and functional processes for delivering an end-to-end service associated with the system 108.

In an example embodiment, the conversation orchestration service engine 202 may receive a message request from the computing device 104. The message request may correspond to a conversation initiated by a user. In an example embodiment, the conversation orchestration service engine 202 facilitates determination of a quick and appropriate response to the message request. In an example embodiment, the conversation orchestration service engine 202 may obtain an intent and/or tags associated with the message request from the intent and tag generator 204.

Further, the conversation orchestration service engine 202 may check if the generated intent and/or tags exist in the database 210. In an example embodiment, the conversation orchestration service engine 202 may determine whether the generated intent and/or tags associated with the message request have already been answered previously by one or more knowledge sources and are stored in the database 210. Simultaneously, the conversation orchestration service engine 202 may transmit the generated intent and/or tags to the knowledge source search engine 206 to asynchronously invoke or query all the available knowledge sources for a response, for example, a predicted response.

In an example embodiment, in case the intent and/or tags associated with the message request exist in the database 210, the conversation orchestration service engine 202 may send a candidate response, associated with a highest score of a knowledge source, to the computing device 104. In an example embodiment, the candidate response may be a predicted response or a pre-stored response. The candidate response may correspond to a predicted response from a knowledge source that has been assigned a highest score. Alternatively, the candidate response may correspond to a pre-stored response in the database 210 from a knowledge source that has been assigned a highest score. It should be understood that the candidate response is the most accurate response determined by the system 108 based on continuous self-learning and feedback from the previously provided responses or past interactions/conversations.

In an example embodiment, the conversation orchestration service engine 202 may compare scores associated with pre-stored responses and send the candidate response associated with the highest score. It should be understood that the mentioned scores are current scores associated with the knowledge sources (and hence, pre-stored responses) from which a respective response may be obtained.

In an example embodiment, the conversation orchestration service engine 202 may determine an ambiguity among the scores associated with the pre-stored responses based on the comparison of the scores. Ambiguity may refer to a tie in scores associated with the pre-stored responses. Additionally, or alternatively, ambiguity may refer to nearby scores, for example 5% to 10% deviation in scores of the pre-stored response. In this embodiment, the conversation orchestration service engine 202 may check for one or more additional scores associated with the pre-stored responses. The conversation orchestration service engine 202 may compare the one or more additional scores associated with the pre-stored responses to determine a candidate response. For example, the one or more additional scores may include, but are not be limited to, a prediction score, a feedback score, and the like. Based on the comparison of the one or more additional scores, the conversation orchestration service engine 202 may send a response with the highest score (for example, current score, prediction score, feedback score, or a combination) to the computing device 104.

Additionally, or alternatively, in case the intent and/or tags do not exist in the database 210, the conversation orchestration service engine 202 may wait for predicted response(s) from the knowledge source search engine 206. In an example embodiment, the conversation orchestration service engine 202 may receive a prediction score associated with predicted response(s) from the knowledge source search engine 206. Once the conversation orchestration service engine 202 receives the predicted response(s) and/or the prediction score, the conversation orchestration service engine 202 may update the database 210 with the intent and/or tags along with the prediction score for the corresponding knowledge source. Further, the conversation orchestration service engine 202 may send, a response, i.e., the candidate response, selected from amongst the predicted response(s) associated with the highest score of the knowledge source, to the computing device 104.

In another example embodiment, there may be a scenario where information related to at least an intent, a tag, a response, and the like may have been updated in one of the knowledge sources since the last time the system 108 queried the knowledge sources. In such a scenario, the conversation orchestration service engine 202 may receive a notification of the updated information from the knowledge source(s). In an example embodiment, this notification may be triggered as and when there is an update of information in the knowledge sources. The conversation orchestration service engine 202 may check if an intent and/or tag associated with the updated information exists in the database 210. In case the intent and/or tag associated with the updated information exists in the database 210, the conversation orchestration service engine 202 may update the database 210 with the updated information. In case the intent and/or tag associated with the updated information does not exist in the database 210, the conversation orchestration service engine 202 may ignore the updated information received from the knowledge source(s). It should be understood that the database 210 may be updated continuously in the background in order to optimize and make the system 108 more dynamic in nature, and hence, improving the responses provided to the computing device 104.

Intent and Tag Generator 204

Referring to FIG. 2, the intent and tag generator 204 may refer to an engine that determines an intent and/or tags associated with the message request received from the computing device 104. In particular, the intent and tag generator 204 may receive the message request from the conversation orchestration service engine 202 to determine the intent and/or tags. It should be understood that intents may refer to intentions of an end user such as the user 102 of FIG. 1. In an example embodiment, the intent and tag generator 204 may pre-process the message request to generate the intent and/or tags.

In an example embodiment, the intent and tag generator 204 may be implemented as a machine learning (ML)-based engine. In an example embodiment, the intent and tag generator 204 may implement natural language processing (NLP) to automatically derive the user's intent from the message request and then tag the message request accordingly. For example, the intent and tag generator 204 may generate keywords by removing stop words. Additionally, or alternatively, the intent and tag generator 204 may generate synonyms of the keywords. A person of ordinary skill in the art will understand that NLP may be concerned with computers processing and analyzing natural language, i.e., any language that has developed naturally, rather than artificially, such as with computer coding languages.

In an example embodiment, the intent and tag generator 204 may utilize named entity recognition (NER) for pre-processing the message request. A person of ordinary skill in the art will understand that NER may refer to a form of NLP that involves identification of key information in the text and classification into a set of predefined categories. In such an embodiment, a first phase of NER may involve training the ML model on annotated messages, and a second phase may involve using the trained model to annotate and/or determine intent and tags associated with the messages. It should be understood that the time taken for training the ML model may vary depending on the complexity of the model.

Additionally, or alternatively, the intent and tag generator 204 may utilize Natural Language Toolkit (NLTK) WordNet to generate synonyms of the keywords extracted. A person of ordinary skill in the art will understand that NLTK may refer to a suite of libraries and programs for symbolic and statistical natural language processing for English written in the Python programming language, and WordNet may refer to a lexical database of English language, specifically designed for NLP.

In an example embodiment, the intent and tag generator 204 may generate the intent and/or tags for the message request and send the generated intent and/or tags to the conversation orchestration service engine 202 for further processing.

Knowledge Source Search Engine 206

Referring to FIG. 2, the knowledge source search engine 206 may refer to a search engine platform used to invoke queries to one or more configured knowledge sources. In an example embodiment, the knowledge source search engine 206 may receive the generated intent and/or tags associated with the message request from the conversation orchestration service engine 202. The knowledge source search engine 206 may asynchronously invoke a search query to one or more configured knowledge sources for a response (for example, predicted response) to the message request. In an example embodiment, the knowledge source search engine 206 may receive a predicted response(s) to the message request from the one or more knowledge sources. Further, the knowledge source search engine 206 may evaluate the search results, i.e. the predicted response(s) and send the predicted response(s) to the conversation orchestration service engine 202.

In an example embodiment, the knowledge source search engine 206 may include an NLP processor that handles search queries. In an example embodiment, the knowledge source search engine 206 may receive a predicted score associated with the predicted response(s) from the one or more knowledge sources. In an example embodiment, the knowledge source search engine 206 may trigger parallel events to run an NLP model on each of the configured knowledge sources for the generated intent and/or tags in order to obtain a prediction score and/or a predicted response(s) from each knowledge source. The knowledge source search engine 206 may send the prediction score and/or the predicted response(s) to the conversation orchestration service engine 202.

Scoring Engine 208

Referring to FIG. 2, the scoring engine 208 may refer to an artificial intelligence (AI) engine used for determining and/or calculating scores associated with each knowledge source for a respective response. In an example embodiment, the scoring engine 208 may implement a scoring model. The scoring model may compute a current score ($\alpha$) stored in the database 210, a prediction score ($\beta$), and a derived score ($\alpha d$). It should be understood that each of the current score ($\alpha$) and the prediction score ($\beta$) may be greater than or equal to 0 and less than or equal to 1, i.e., $$0 \le \alpha \le 1$$

$$\text{and}$$

$$0 \le \beta \le 1$$

In an example embodiment, the scoring engine 208 may determine or calculate one or more parameters including, but not limited to, prediction up (Pu), prediction down (Pd), thumbs up (Tu), thumbs down (Td), performing zone, and underperforming zone. For example, the prediction up (Pu) parameter may refer to a count of number of times the prediction score ($\beta$) is equal to or greater than a predefined threshold. The prediction down (Pd) parameter may refer to a count of number of times the prediction score ($\beta$) is less than a predefined threshold. In an example embodiment, the predefined threshold may be configured by an administrator of the system 108. In an example embodiment, the predefined threshold may be configured as a value between 0.7 and 1.

Further, it should be understood that the thumbs up (Tu) parameter may refer to a number of thumbs up or positive feedback received from a user of the computing device for each knowledge source. The thumbs down (Td) parameter may refer to a number of thumbs down or negative feedback received from a user of the computing device for each knowledge source. Furthermore, it should be understood that performing zone may refer to a zone of knowledge source where the derived score (ad) for a respective knowledge source is greater than or equal to a predefined threshold. The underperforming zone may refer to a zone of knowledge source where the derived score ($\alpha d$) is less than a predefined threshold. In an example embodiment, the predefined threshold may be 0.7, and knowledge sources having the derived score greater than or equal to 0.7 may be categorized in the performing zone. In an example embodiment, knowledge sources having the derived score less than 0.7 may be categorized in the underperforming zone.

In accordance with embodiments of the present disclosure, if the current score ($\alpha$) for a knowledge source is equal to the prediction score ($\beta$), then the current score ($\alpha$) may remain the same. Further, in such an embodiment, the prediction up (Pu) parameter for the respective knowledge source may be incremented by one, i.e., $$Pu = Pu + 1$$

In another example embodiment, if the current score ($\alpha$) for a knowledge source is greater than the prediction score ($\beta$), then the scoring engine 208 may implement the following two steps:

$$\text{Step 1: } \alpha d = \frac{100\alpha - 1}{100} \text{ if } \alpha > \beta \text{ and } \alpha > 0$$

$$\alpha d = \frac{100\alpha - 1}{100} \text{ if } \alpha > \beta \text{ and } \alpha > 0$$

$$Pd = Pd + 1$$

$$\text{Step 2: } \alpha = \alpha d$$

In another example embodiment, if the current score ($\alpha$) for a knowledge source is less than the prediction score ($\beta$) and the prediction score ($\beta$) is less than a predefined threshold, then the scoring engine 208 may implement the following steps:

$$\text{Step 1: } \alpha d = \frac{100\alpha - 1}{100} \text{ if } \alpha < \beta \text{ and } 0 \leq \alpha < 0.7 \text{ (predefined threshold)}$$

$$Pd = Pd + 1$$

$$\text{Step 2: } \alpha = \alpha d$$

In yet another example embodiment, if the prediction score ($\beta$) is equal to or greater than the current score ($\alpha$) and the predefined threshold, then the scoring engine 208 may implement the following steps:

$$\text{Step 1: } \alpha d = \frac{\alpha + \beta}{2} \text{ if } \alpha \leq \beta \geq 0.7 \text{ (predefined threshold)}$$

$$Pu = Pu + 1$$

$$\text{Step 2: } \alpha = \alpha d$$

It may be appreciated that the scoring engine 208 may calculate the above described score(s) for each knowledge source, and save this information in the database 210. This is further explained with reference to FIG. 3 below.

Additionally, or alternatively, in accordance with embodiments of the present disclosure, the scoring engine 208 may calculate a feedback score by implementing a feedback scoring model. The feedback score may be based on a feedback obtained on a response from a user of the computing device 104. In an example embodiment, the feedback score may include, but not be limited to, thumbs up (Tu) and thumbs down (Td) parameters. For example, but not limitation, consider 10000 requests per day and for 10% of total requests, if the system 108 receives a feedback from the computing device 104, then the scoring engine 208 may calculate the thumbs up (Tu) parameter as follows:

$$Tu = \frac{1000\alpha + 1}{1000} \text{ if } \alpha < 1$$

$$Tu = 1 \text{ if } \alpha \geq 1$$

Likewise, the scoring ending 208 may calculate the thumbs down (Td) parameter as follows:

$$Td = \frac{100\alpha - 1}{100} \text{ if } \alpha > 0$$

$$Td = 0 \text{ if } \alpha \leq 0$$

In general, if "n" is the number of requests per day, then the scoring engine 208 may calculate the thumbs up (Tu) parameter as follows:

$$Tu = \frac{0.1n\alpha + 1}{0.1n} \text{ if } \alpha < 1$$

$$Tu = 1 \text{ if } \alpha \geq 1$$

Likewise, the scoring engine 208 may calculate the thumbs down (Td) parameter as follows:

$$Td = \frac{0.01n\alpha - 1}{0.01n} \text{ if } \alpha > 0$$

$$Td = 0 \text{ if } \alpha \leq 0$$

This is further explained with reference to FIG. 4 below.

In an example embodiment, the system 108 may determine a candidate response to the message request by comparing the current scores ($\alpha$) associated with each response. In case of tie between the current scores ($\alpha$) of two knowledge sources for a particular tag or nearby scores, the scoring engine 208 and/or the conversation orchestration service engine 202 may compare one or more additional scores. The one or more additional scores may include, but not be limited to, the prediction up (Pu) and prediction down (Pd) parameters, or the thumbs up (Tu) and thumbs down (Td) parameters. In an example embodiment, in case of tie or nearby scores, the scoring engine 208 and/or the conversation orchestration service engine 202 may compare the feedback score, i.e., the thumbs up (Tu) and thumbs down (Td) parameters. In case there is no feedback score, then the scoring engine 208 and/or the conversation orchestration service engine 202 may compare the prediction up (Pu) and prediction down (Pd) scores for the respective knowledge sources. In an example embodiment, the nearby score may be defined as scores with at least 5% to 10% deviation with respect to each other.

It should be understood that the scoring engine 208 may calculate the score of each knowledge source associated with a response for every message request received from a computing device (e.g., computing device 104), and hence, the scores associated with the knowledge sources may change dynamically.

Further, as discussed above, the scoring engine 208 may determine a performing zone and an underperforming zone. For example, a knowledge source may belong to the performing zone if the current score ($\alpha$) for the knowledge source is greater than or equal to a predefined threshold. A knowledge source may belong to the underperforming zone if the current score ($\alpha$) for the knowledge source is less than a predefined threshold. In an example embodiment, a knowledge source in the performing zone may maintain a current score ($\alpha$) equal to or greater than a predefined threshold for every message request associated with a specific intent and/or tag in order to remain in the performing zone. A knowledge source that belongs to the underperforming zone has to constantly maintain a current score ($\alpha$) equivalent to the predefined threshold or more to progress towards the performing zone.

In an example embodiment, the conversation orchestration service engine 202 may search for and compare scores for knowledge sources that belong to the performing zone in order to obtain a response from the highest scored knowledge source. Alternatively, if there is no knowledge source in the performing zone, then the conversation orchestration service engine 202 may send the response from the highest scored knowledge source in the underperforming zone. In such an embodiment, the conversation orchestration service engine 202 may send a request for feedback along with the response to the computing device 104.

By way of example, but not limitation, consider a use case wherein the predefined threshold may be configured as 0.7.

| Score | Tag |
|---|---|
| Knowledge Source KS1 | 0.3 |
| Knowledge Source KS2 | 0.8 |
| Knowledge Source KS3 | 0.9 |

In the above example, knowledge sources KS2 and KS3 belong to performing zones, and knowledge source KS1 belongs to underperforming zone.

It should be understood that the information, such as above, may be saved in the database 210. Through this feature of continuous update of scores in the database 210, the system 108 is able to maintain the latest status of the knowledge sources for each intent and/or tag or their combination with latest scores. Further, the feedback score and prediction up/down score help in ambiguous use cases to select the best knowledge source to deliver the most appropriate response. In particular, insights may be derived from analytics data stored in the database 210 based on the intent and/or tag, current score, feedback score, prediction up/down score, and/or knowledge sources associated with each intent and/or tag with specific scores.

Database 210

Referring to FIG. 2, the database 210 may include one or more data stores for storing information including, but not limited to, intent and/or tags, a response for each tag, a knowledge source from where the response is received, and a score associated with the knowledge source provided by the soring engine 208. In an example embodiment, the score may include, but not limited to, current score, feedback score, and prediction score or a combination thereof.

In accordance with embodiments of the present disclosure, the database 210 may be continuously updated for every message request received from a computing device. In an example embodiment, the database 210 may be updated for a current score associated with a knowledge source based at least on the prediction score and the feedback score. For example, the database 210 may be updated with information from the knowledge source search engine 206 if the generated intent and/or tags are unavailable at the database 210. In this case, the database 210 may be updated with the response received from the knowledge source search engine 206 along with the knowledge source and score associated with the response. In another example, if there is an update of information in one of the knowledge sources and if the associated intent and/or tag exists in the database 210, then the database 210 may be updated with such information.

In an example embodiment, the database 210 may integrate with the scoring engine 208 in order to remain updated with the latest information corresponding to the current score, feedback score, and/or prediction score. Further, the database 210 may integrate with the knowledge source search engine 206 in order to remain updated with the latest information corresponding to response(s) along with a knowledge source providing the respective response(s).

Event Routing Engine 212

Referring to FIG. 2, the event routing engine 212 may refer to a routing engine that collects messages from one or more applications and routes the messages to target applications. In an example embodiment, the event routing engine 212 may manage events such as, but not limited to, searching intent and/or tag in the database 210 and the knowledge source search engine 206. For example, the conversation orchestration service engine 202 may send the generated intent and/or tags associated with the message request to the event routing engine 212. Based on the received message request, the event routing engine 212 may trigger further actions simultaneously, i.e. one event action to search the intent and/or tags in the database 210, and another event action to obtain predicted response(s) and prediction score from the knowledge source search engine 206 for the intent and/or tags.

Although FIG. 2 shows exemplary components of the system 108, in other embodiments, the system 108 may include fewer components, different components, differently arranged components, or additional functional components than depicted in FIG. 2. Additionally, or alternatively, one or more components of the system 108 may perform functions described as being performed by one or more other components of the system 108.

Figure 3:
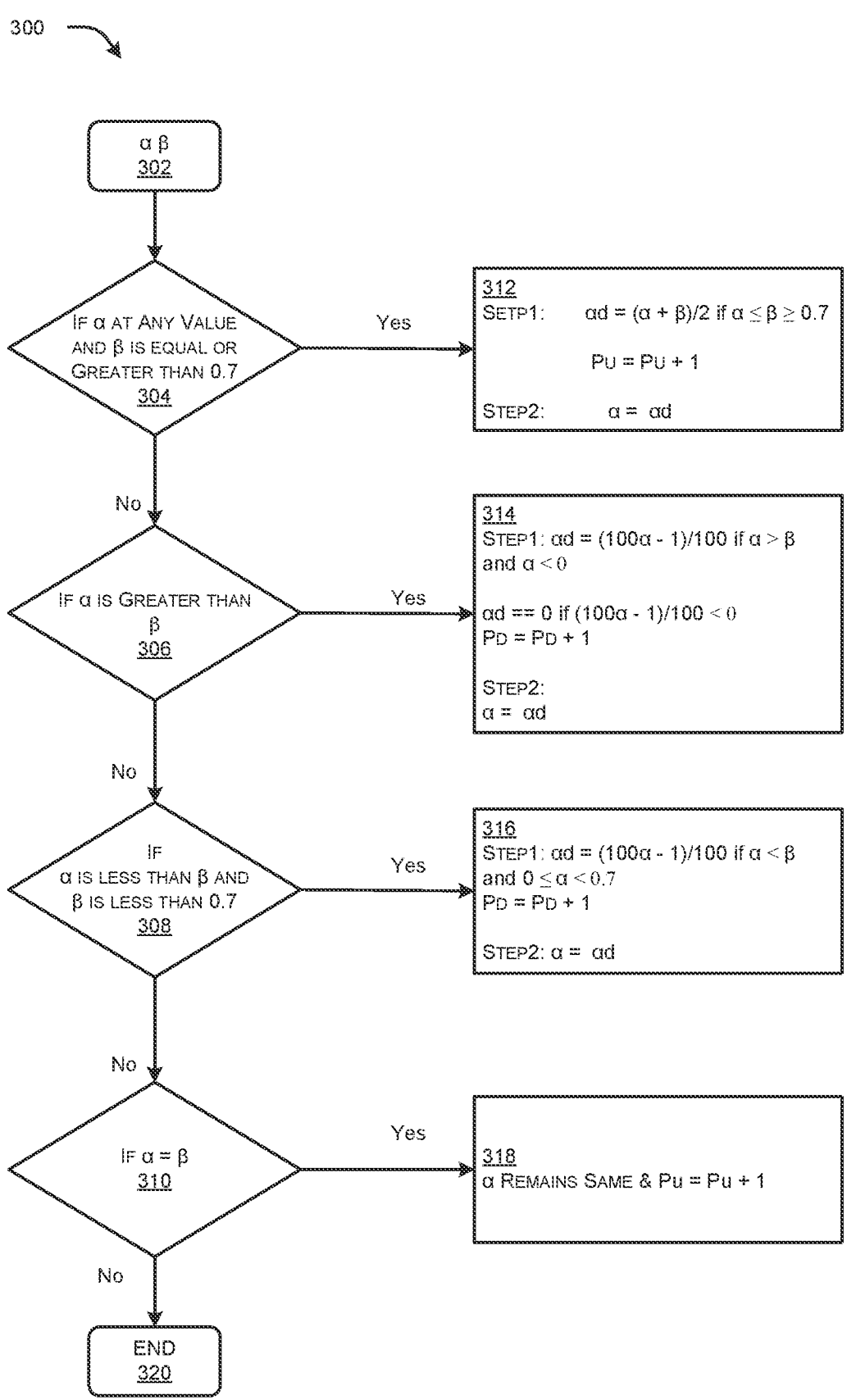
FIG. 3 illustrates an example flow diagram for implementing a scoring model, in accordance with embodiments of the present disclosure.

FIG. 3 illustrates an example flow diagram 300 for implementing a scoring model, in accordance with embodiments of the present disclosure. It may be appreciated that a scoring engine such as the scoring engine 208 of FIG. 2 may implement the steps of the flow diagram 300.

Referring to FIG. 3, at step 302, the scoring engine 208 may compute current score ($\alpha$) and prediction score ($\beta$) of a knowledge source. In an example embodiment, these scores may be saved at a database such as the database 210 of FIG. 2.

At step 304, the scoring engine 208 may determine if the prediction score ($\beta$) is equal to or greater than the current score ($\alpha$) and a predefined threshold. In an example embodiment, the predefined threshold may be configured as 0.7. In case of positive determination, the scoring engine 208, at step 312, may implement the following steps:

$$\text{Step 1: } \alpha d = \frac{\alpha + \beta}{2} \text{ if } \alpha \le \beta \ge 0.7 \text{ (predefined threshold)}$$

$$Pu = Pu + 1$$

$$\text{Step 2: } \alpha = \alpha d$$

In case of negative determination at step 304, the scoring engine 208 may proceed to step 306. In particular, the scoring engine 208, at step 306, may determine if the current score ($\alpha$) for a knowledge source is greater than the prediction score ($\beta$). In case of positive determination, the scoring engine 208, at step 314, may implement the following steps:

$$\text{Step 1: } \alpha d = \frac{100\alpha - 1}{100} \text{ if } \alpha > \beta \text{ and } \alpha > 0$$

-continued $$\alpha d = 0 \text{ if } \frac{100\alpha - 1}{100} < 0$$

$$Pd = Pd + 1$$

Step 2: $\alpha = \alpha d$

In case of negative determination at step 306, the scoring engine 208 may proceed to step 308. In particular, at step 308, the scoring engine 208 may determine if the current score ($\alpha$) for a knowledge source is less than the prediction score ($\beta$) and the prediction score ($\beta$) is less than a predefined threshold. In case of positive determination, at step 316, the scoring engine 208 may implement the following steps:

Step 1: $\alpha d = \dfrac{100\alpha + 1}{100}$ if $\alpha < \beta$ and $0 \le \alpha < 0.7$ (predefined threshold)

$$Pd = Pd + 1$$

Step 2: $\alpha = \alpha d$

In case of negative determination at step 308, the scoring engine 208 may proceed to step 310. In particular, at step 310, the scoring engine 208 may determine if the current score ($\alpha$) for a knowledge source is equal to the prediction score ($\beta$). In case of negative determination at step 310, the scoring engine 208 may end the determination of scores at step 320. In case of positive determination at step 310, the scoring engine 208, at step 318, may implement the following:

$$Pu = Pu + 1$$

$\alpha$ Remains Same

In an example embodiment, the scoring engine 208 may calculate the score(s) for each knowledge source following the steps shown in FIG. 3, and save this information in the database 210.

It will be appreciated that the steps shown in FIG. 3 are merely illustrative. Other suitable steps may be used to implement the scoring model, if desired. Moreover, the steps of the method 300 may be performed in any order and may include additional steps.

Figure 4:
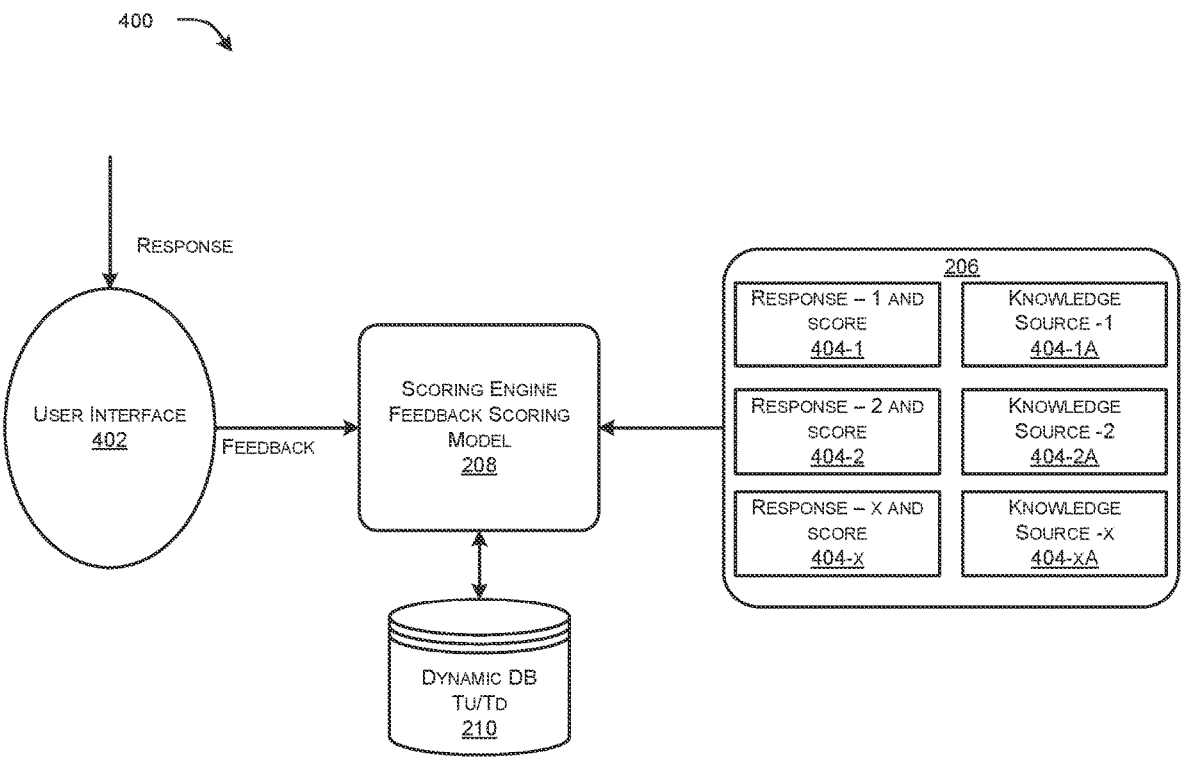
FIG. 4 illustrates an example representation of a system architecture for implementing feedback scoring mechanism, in accordance with embodiments of the present disclosure.

FIG. 4 illustrates an example representation of a system architecture 400 for implementing feedback scoring mechanism, in accordance with embodiments of the present disclosure. As shown in FIG. 4, the system architecture 400 may include a user interface 402 implemented at a computing device (for example, computing device 104 of FIG. 1), a knowledge source search engine 206, a scoring engine 208 implementing feedback scoring model, and a database 210. A person of ordinary skill in the art will understand that the knowledge source search engine 206, the scoring engine 208, and the database 210 may be similar to respective components of FIG. 2 in their functionality, and hence, may not be described again in detail for the sake of brevity.

Referring to FIG. 4, the scoring engine 208 may receive a feedback from a user (for example, the user 102 of FIG. 1) through the user interface 402 at a computing device (for example, the computing device 104). In an example embodiment, the feedback may be associated with a response provided to the user by an intelligent manager such as the system 108 of FIGS. 1-2.

In an example embodiment, the scoring engine 208 may receive scores associated with respective knowledge sources for a particular response from the knowledge source search engine 206. For example, Response 1 and score 404-1 may be associated with knowledge source 1 404-1A, Response 2 and score 404-2 may be associated with knowledge source 2 404-2A, Response X and score 404-X may be associated with knowledge source X 404-xA, where X is a number greater than 1.

In accordance with embodiments of the present disclosure, the scoring engine 208 may implement a feedback scoring model to determine feedback score. In an example embodiment, the feedback score may include, but not be limited to, thumbs up (Tu) parameter and thumbs down (Td) parameter. As described above, the thumbs up (Tu) parameter may refer to a number of thumbs up or positive feedback received from a user of the computing device for each knowledge source. The thumbs down (Td) parameter may refer to a number of thumbs down or negative feedback received from a user of the computing device for each knowledge source.

If "n" is the number of requests received from a user per day, then the scoring engine 208 may calculate the thumbs up (Tu) parameter as follows:

$$Tu = \frac{0.1n\alpha + 1}{0.1n} \text{ if } \alpha < 1$$

$$Tu = 1 \text{ if } \alpha \ge 1$$

Likewise, the scoring engine 208 may calculate the thumbs down (Td) parameter as follows:

$$Td = \frac{0.01n\alpha - 1}{0.01n} \text{ if } \alpha > 0$$

$$Td = 0 \text{ if } \alpha \le 0$$

In an example embodiment, $\alpha$ is the current score associated with a knowledge source and response. These parameters may be stored at the database 210 in the form of feedback score. For example, but not limitation, for 10000 requests received per day, if the scoring engine 208 receives a feedback for 10% of the requests, then the database 210 may store the scores as shown below.

| $\alpha$ | Tu | Td |
|---|---|---|
| 0 | 0.001 | 0 |
| 0.1 | 0.101 | 0.09 |
| 0.2 | 0.201 | 0.19 |
| 0.3 | 0.301 | 0.29 |
| 0.4 | 0.401 | 0.39 |
| 0.5 | 0.501 | 0.49 |
| 0.6 | 0.601 | 0.59 |
| 0.7 | 0.701 | 0.69 |
| 0.8 | 0.801 | 0.79 |
| 0.9 | 0.901 | 0.89 |
| 1 | 1 | 0.99 |

In an example embodiment, in case of tie between the current scores of knowledge sources, the disclosed system may compare the feedback score of the knowledge sources to determine a response to a request from a user.

It may be appreciated that the system architecture 400 may be modular and flexible to accommodate any kind of changes in the system architecture 400.

Figure 5A:
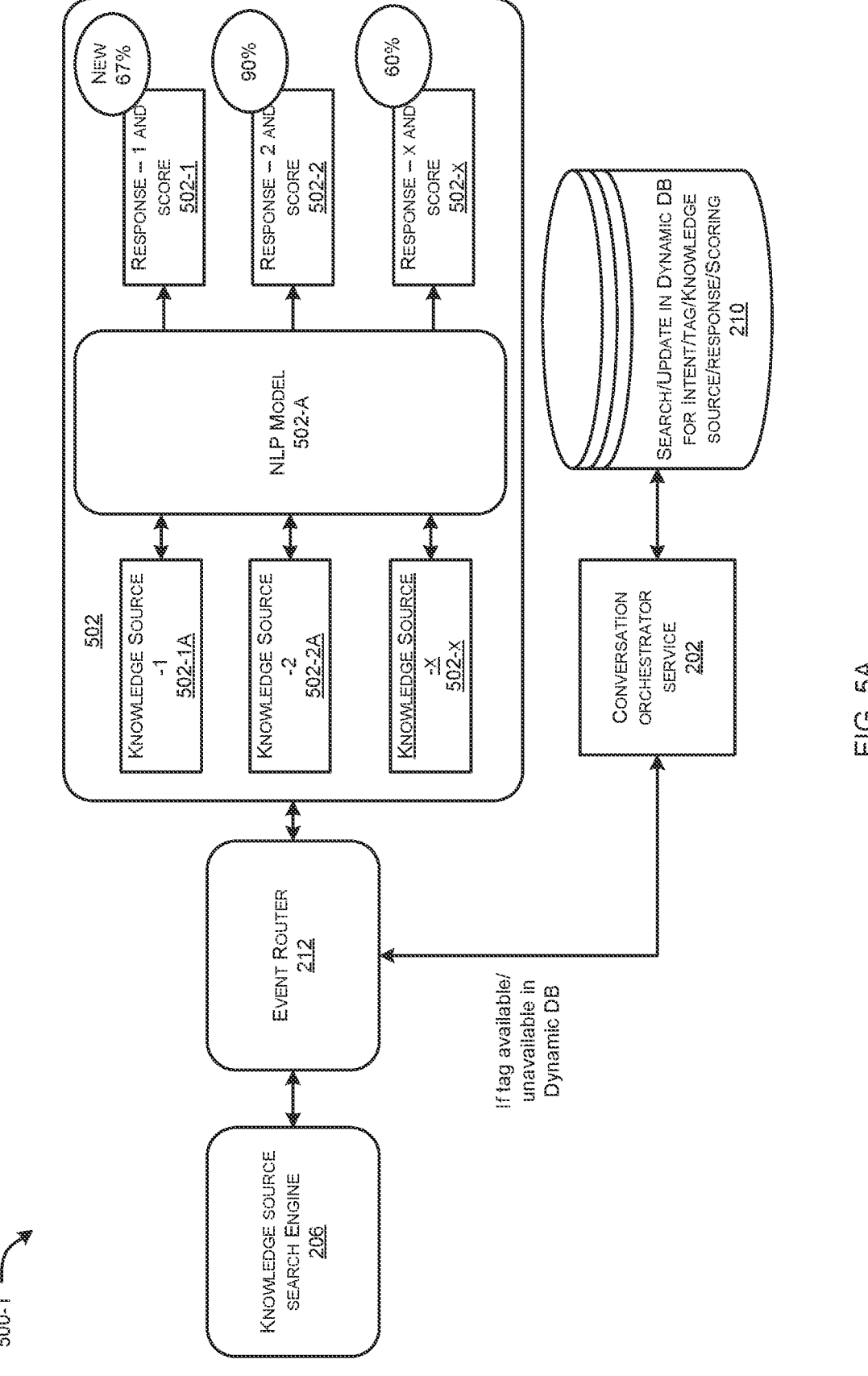
FIG. 5A illustrates an example system architecture for implementing self-learning for a user request, in accordance with embodiments of the present disclosure.

FIG. 5A illustrates an example system architecture 500-1 for implementing self-learning for a user request, in accordance with embodiments of the present disclosure. As shown, the system architecture 500-1 may include a knowledge source search engine 206, an event routing engine 212, one or more knowledge sources 502, a conversation orchestration service engine 202, and a database 210.

A person of ordinary skill in the art will understand that the knowledge source search engine 206, the event routing engine 212, the conversation orchestration service engine 202, and the database 210 may be similar to the respective components of FIG. 2 in their functionality, and hence, may not be described again in detail for the sake of brevity.

Referring to FIG. 5A, for each message request received from a user, the conversation orchestration service engine 202 may obtain an intent and/or tags from an intent and tag generator such as the intent and tag generator 204 of FIG. 2. The conversation orchestration service engine 202 may transmit the generated intent and/or tags to the database 210 to check for a pre-stored response. Simultaneously, the conversation orchestration service engine 202 may transmit the generated intent and/or tags to the knowledge source search manager 206 via the event routing engine 212 to check for a predicted response from the one or more knowledge sources 502.

In an example embodiment, the knowledge source search engine 206 may asynchronously run a search query to the one or more knowledge sources 502 for the predicted response associated with the generated intent and/or tags. In an example embodiment, the one or more knowledge sources 502 may implement an NLP model 502-A to get the predicted response and an associated prediction score for each knowledge source. In an exemplary embodiment, the NLP model 502-A may include, but not be limited to, BERT, GPT3, MUM, PaML, or the like.

The knowledge source search engine 206 may receive the predicted response and the prediction score from the knowledge source(s) 502 via the event routing engine 212. For example, the knowledge source search engine 206 may receive Response 1 and score 502-1 from knowledge source 1 502-1A, Response 2 and score 502-2 from knowledge source 2 502-2A, and Response x and score 502-x from knowledge source x 502-xA, where x is a number greater than 1. Further, the knowledge source search engine 206 may send this information to the conversation orchestration service engine 202 via the event routing engine 212. The conversation orchestration service engine 202 may update the database 210 with the received information, i.e., the predicted response(s) and the prediction score.

It should be understood that self-learning for the system happens for every message request from a user that may be associated with a known or an unknown intent and/or tag in the database 210. Additionally, self-learning happens when any change or update or modification is made to a knowledge source 502 associated with a known intent and/or tag existing in the database 210.

Figure 5B:
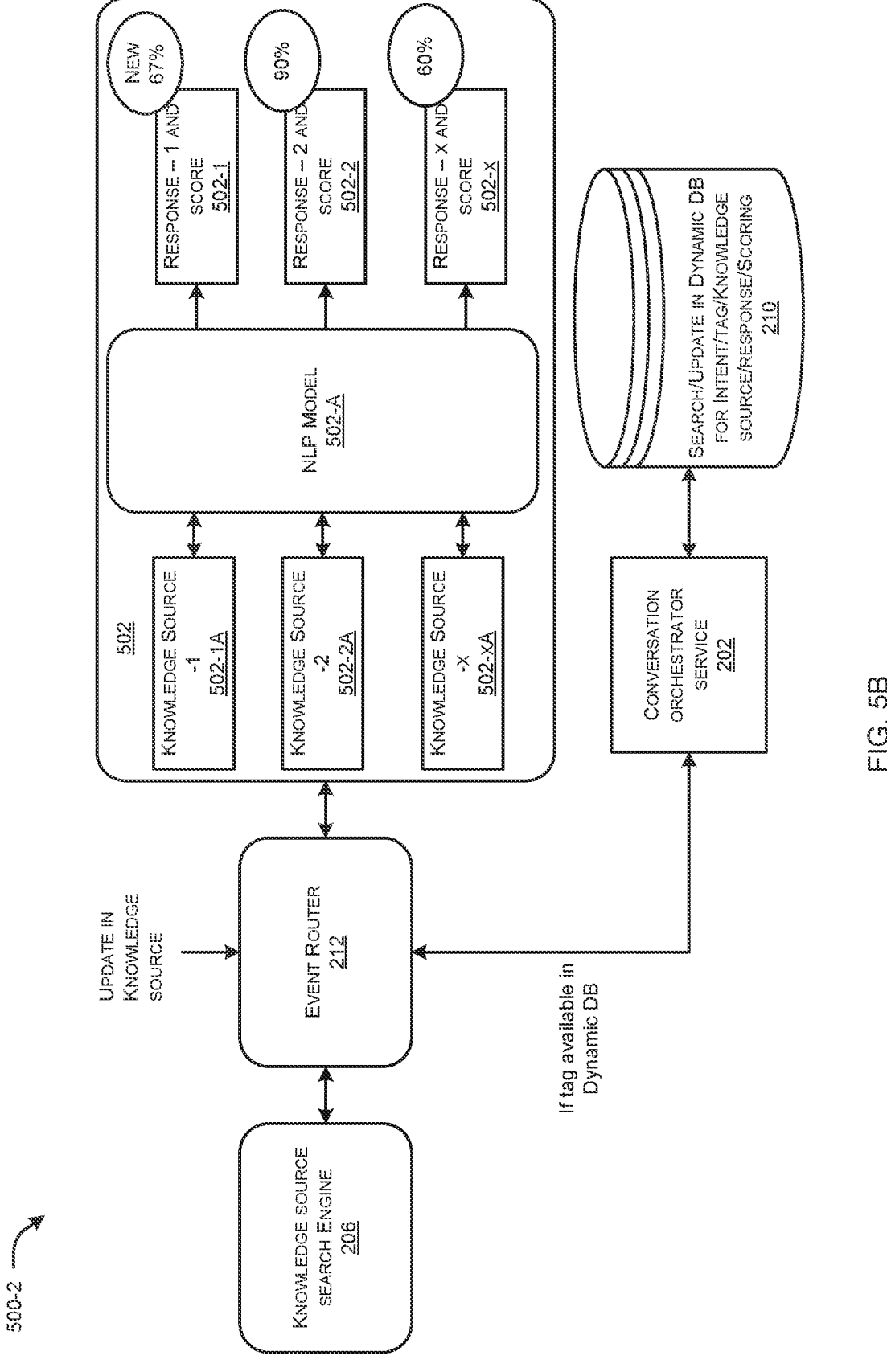
FIG. 5B illustrates an example system architecture for implementing self-learning for an update in a knowledge source, in accordance with embodiments of the present disclosure.

FIG. 5B illustrates an example system architecture 500-2 for implementing self-learning for an update in a knowledge source, in accordance with embodiments of the present disclosure. As shown, the system architecture 500-2 may be similar to the system architecture 500-1 of FIG. 5A, and may include similar components with like reference numerals.

Referring to FIG. 5B, whenever there is an update in the one or more knowledge sources 502, an event on knowledge source update is instantly triggered in the background at the event routing engine 212. In an example embodiment, the event routing engine 212 may identify an intent and/or tag associated with the updated information, and send the intent and/or tag to the conversation orchestration service engine 202. The conversation orchestration service engine 202 may check for the intent and/or tag in the database 210.

In an example embodiment, if the intent and/or tag does not exist in the database 210, the conversation orchestration service engine 202 and/or the event routing engine 212 may ignore the updated information. Alternatively, if the intent and/or tag exists in the database 210, the conversation orchestration service engine 202 may send the intent and/or tag to the knowledge source search engine 206. The knowledge source search engine 206 may obtain the updated information from the associated one or more knowledge sources 502. For example, the updated information may include, but not be limited to, a predicted response, a prediction score, and the like. In an example embodiment, the one or more knowledge sources 502 may use an NLP model 502-A to obtain a predicted response and a prediction score.

The knowledge source search engine 206 may send the updated information to the conversation orchestration service engine 202 through the event routing engine 212. The conversation orchestration service engine 202 may update the database 210 with this information.

Therefore, the present disclosure implements parallel events and actions. For example, once the conversation orchestration service engine 202 receives an intent and/or tag from an intent and tag generator (for example, the intent and tag generator 204), the conversation orchestration service engine 202 may send the generated intent and/or tag to the event routing engine 212. The event routing engine 212 may trigger parallel actions, i.e. first, to search the generated intent and/or tag in the database 210, and second, to send the generated intent and/or tag to the knowledge source search engine 206 for obtaining predicted response and prediction scores from the knowledge sources 502. Further, the knowledge source search engine 206 may trigger parallel events to run an NLP model 502-A on each knowledge source 502 configured for the particular intent and/or tag, and obtain predicted response and/or prediction score from each knowledge source 502.

Based on the event outcome, further actions may be taken by the conversation orchestration service engine 202, including, but not limited to, (a) if it is a message request from a user and the intent and/or tag is found in the database 210, the conversation orchestration service engine 202 may select the highest scored knowledge source response based on the scoring model and may send to the user, (b) if it is a known intent and/or tag, the conversation orchestration service engine 202 may update the data, i.e., score, response, and/or knowledge source information, received from the knowledge source search engine 206 in the database 210, and (c) if it is an unknown intent and/or tag, the conversation orchestration service engine 202 may update the data in the database 210, select the highest scored knowledge source response based on the scoring model, and send the response to the user.

In an example embodiment, the above-mentioned parallel events may be implemented based on an event-based architecture. Cloud vendors may provide services to build and manage event-driven solutions by centrally controlling event ingestion, delivery, security, authorization, and error handling. For example, the disclosed system may be implemented using external cloud platforms including, but not limited to, AWS EventBridge, Azure Event Grid, or Google EventArc.

As an example, but not limitation, parallelism may be achieved through using event driven architecture. A fully managed event bus service, AWS EventBridge (Similar to Azure Event Grid/Google EventArc) receives events from disparate sources, identifies a target based on a routing rule, and delivers near real-time data to that target. When an event from either of the sources is received, a schema discovery is executed. EventBridge confirms that the event is registered in the schema, and looks for the rules for the specific events, i.e., where is it to be sent to, or the notification that needs to be sent to a connected device. Rules may be used to filter events. Incoming events for a given event bus are matched by a rule and routed to targets for processing. A single rule can route to multiple targets, which are all processed concurrently. Rules enable different application components to search for and process events of interest to them. A rule can modify an event before it is sent to the target by passing only specific parts of it or overwriting it with a constant.

It may be appreciated that the system architecture 500-1 and/or 500-2 may be modular and flexible to accommodate any kind of changes in the system architecture 500-1, 500-2.

Figure 6:
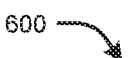
FIG. 6 illustrates an example flow diagram of a method for providing intelligent responses dynamically, in accordance with embodiments of the present disclosure.

FIG. 6 illustrates an example flow diagram of a method 600 for providing intelligent responses dynamically, in accordance with embodiments of the present disclosure. It may be appreciated that like reference numerals may be used to depict similar components from previous figures. For example, as shown, the disclosed system may include a conversation orchestration service engine 202, an intent and tag generator 204, an event routing engine 212, a database 210, and a knowledge source search engine 206.

Referring to FIG. 6, the method 600 may start at step 602, where a user 102 may initiate a conversation by sending a request. In an example embodiment, the user 102 may send a request using one or more user interfaces at a computing device (for example, the computing device 104). Further, at step 604, the conversation user interface 102-1 may forward the request to an intelligent manager or system (for example, the system 108). In an example embodiment, the conversation user interface 102-1 may forward the request to the conversation orchestration service engine 202.

At step 606, the conversation orchestration service engine 202 may send the request to the intent and tag generator 204 to obtain an intent and/or tags associated with the request. At step 608, the intent and tag generator 204 may generate the intent and/or tags and send the generated intent and/or tags to the conversation orchestration service engine 202. Further, at step 610, the conversation orchestration service engine 202 may send the generated intent and/or tags to the event routing engine 212.

At step 612, the event routing engine 212 may concurrently transmit the intent and/or tags to the database 210 and the knowledge source search engine 206 for further actions. At step 614, the conversation orchestration service engine 202 and/or the event routing engine 212 may determine or check if the intent and/or tag exist in the database 210. In case of positive determination, the event routing engine 212, at step 626, may send the response along with score and/or knowledge source information to the conversation orchestration service engine 202. At step 630, the conversation orchestration service engine 202 may determine a response based on a scoring model. In an example embodiment, the conversation orchestration service engine 202 may send the response with the highest score to the conversation user interface 102-1. At step 632, the conversation user interface 102-1 may forward the response to the user 102. At step 634, the user 102 may receive the response.

In an example embodiment, at step 614, in case of negative determination, i.e. if the intent and/or tags do not exist in the database 210, the event routing engine 212 may trigger an event to search the intent and/or tag in the knowledge source search engine 206. At step 616, the knowledge source search engine 206 may search for a predicted response in one or more configured knowledge sources 206-1 using an NLP model (for example, NLP model 502-A).

In an example embodiment, at step 618, the event routing engine 212 may search for a configured predicted response in the knowledge sources, for example, knowledge source A 206-2 and knowledge source B 206-3. The event routing engine 212 may receive the predicted response(s) at steps 620, 622, and 624. In an example embodiment, the knowledge source search engine 206 may receive the predicted response(s) along with respective prediction score from the knowledge sources.

In an example embodiment, at step 628, the event routing engine 212 may send the predicted response(s) along with respective score and knowledge source information to the conversation orchestration service engine 202. The conversation orchestration service engine 202 may send the response based on the scoring model to the conversation user interface 102-1. In particular, the user 102 may receive the response. Simultaneously, the conversation orchestration service engine 202 may upload, at step 636, the database 210 with the information received from the knowledge source search engine 206.

In an example embodiment, at step 638, if there is an update of information in one of the knowledge sources, the knowledge sources may trigger an event to the event routing engine 212. In particular, the event routing engine 212, at step 640, may invoke the intelligent manager or system for an update in the knowledge sources. The event routing engine 212 may send a notification regarding the update of information to the conversation orchestration service engine 202. The conversation orchestration service engine 202, at step 642, may check if an intent and/or tag associated with the updated information exists in the database 210. At step 644, if it is determined that the intent and/or tag does not exist in the database 210, then the conversation orchestration service engine 202 may ignore the updated information. At step 644, if it is determined that the intent and/or tag exists in the database 210, the conversation orchestration service engine 202 may upload the updated information in the database 210 at step 636.

In another example embodiment, the conversation orchestration service engine 202 may send a request for feedback at step 648 along with the response to the conversation user interface 102-1. At step 650, the user 102 may send the feedback associated with the response back to the conversation orchestration service engine 202. The conversation orchestration service engine 202 may save this information in the database 210. In an example embodiment, a scoring engine (for example, the scoring engine 208) may determine a feedback score associated with a response/knowledge source based on the feedback received from the user 102. In an example embodiment, if there is a tie between scores associated with the responses, the conversation orchestration service engine 202, at step 646, may check for the feedback score in the database 210. The conversation orchestration service engine 202 may provide the response/knowledge source with the highest feedback score. In another example embodiment, if the feedback score is unavailable in the database 210, the conversation orchestration service engine 202 may provide the response with the highest prediction score.

Therefore, the present disclosure facilitates running parallel events in order to dynamically update the database in the background while providing an appropriate response to the user, and hence, reducing the response time.

A person of ordinary skill in the art will readily ascertain that the illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Use Case 1—Internet Bill Policy Update

FIGS. 7A-7B illustrate example representations 700 of a conversation between a user and a chatbot implementation of the disclosed systems. In particular, FIG. 7A illustrates an example representation of messages 702, 704, and 706 exchanged between the user and the chatbot conventionally. FIG. 7B illustrates an example representation of messages 702, 704, and 706-1 exchanged between the user and the proposed intelligent manager or system. This will be further explained in detail with respect to FIGS. 8A and 8B.

Figure 8A:
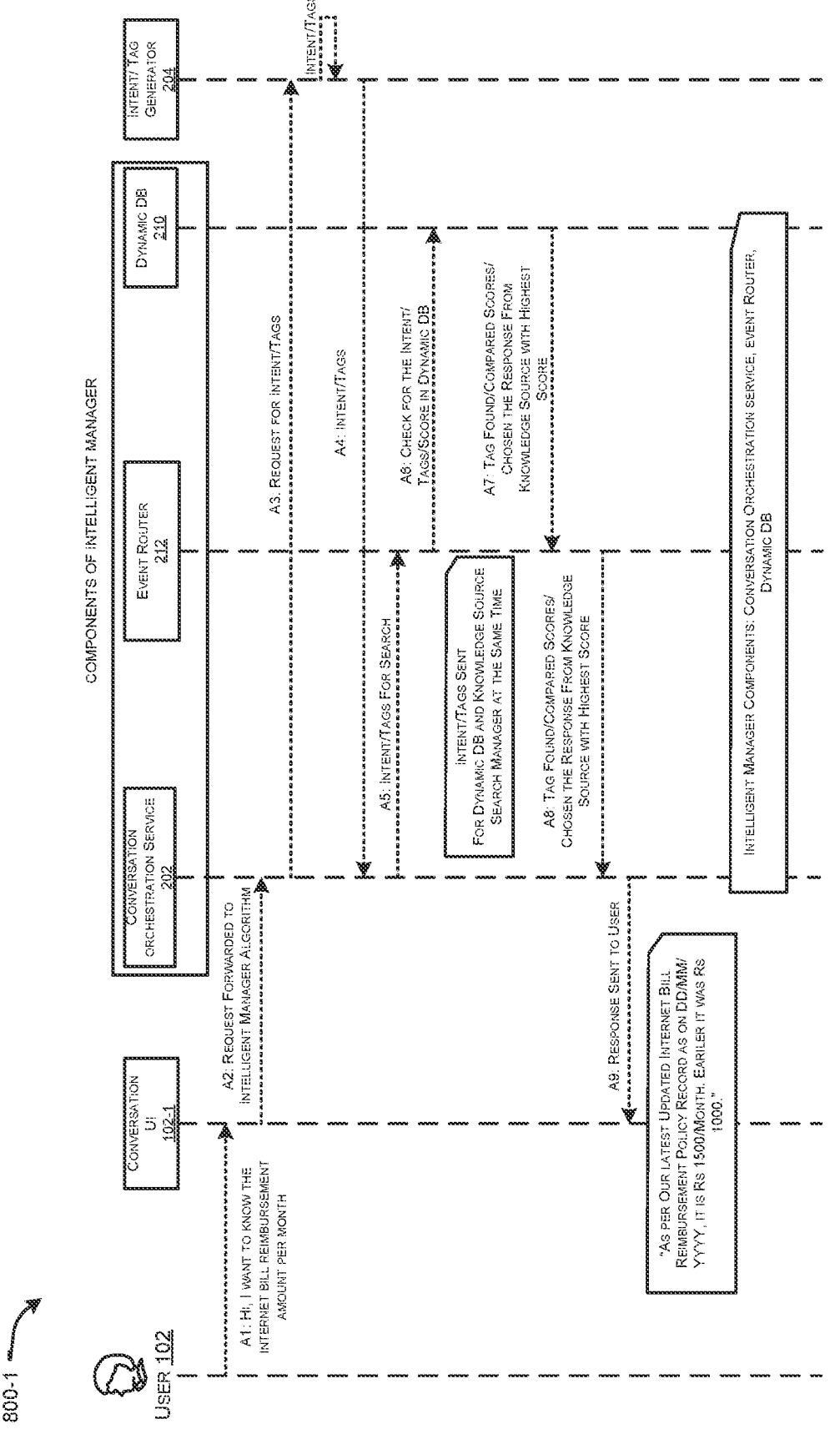
FIG. 8A illustrates an example sequence flow diagram corresponding to the conversation shown in FIG. 7B, in accordance with embodiments of the present disclosure.

FIG. 8A illustrates an example sequence flow diagram 800-1 corresponding to the conversation shown in FIG. 7B, in accordance with embodiments of the present disclosure. It may be appreciated that like reference numerals are used for like components explained earlier.

Referring to FIG. 8A, the user 102 may initiate a conversation by sending a message request in step A1. At step A2, the conversation user interface 102-1 of the computing device (for example, the computing device 104) may send the message request to the intelligent manager or system (for example, 108). In an example embodiment, the conversation user interface 102-1 may sends the message request to the conversation orchestration service engine 202.

At step A3, the conversation orchestration service engine 202 may send a request for intent and/or tags to the intent and tag generator 204. In an example embodiment, the conversation orchestration service engine 202 may send the message request to the intent and tag generator 204. The intent and tag generator 204 may generate an intent and/or tags associated with the message request, and provide the generated intent and/or tags to the conversation orchestration service engine 202 in step A4.

At step A5, the conversation orchestration service engine 202 may send the generated intent and/or tags to the event routing engine 212 to trigger a search event. At step A6, the event routing engine 212 may transmit a search query for the generated intent and/or tags to the database 210 in order to get a pre-stored response. Simultaneously, the event routing engine 212 may transmit a search query to a knowledge source search engine (not shown in FIG. 8A). At step A7, the event routing engine 212 may receive a pre-stored response from the database 210 based on a scoring model. In an example embodiment, the event routing engine 212 may receive the pre-stored response associated with the highest score in the database 210. In an example embodiment, the current scores of pre-stored responses associated with the generated intent and/or tags may be compared, and based on the comparison, the event routing engine 212 may receive the pre-stored response with the highest current score.

At step A8, the conversation orchestration service engine 202 may receive the pre-stored response through the event routing engine 212. The conversation orchestration service engine 202 may send and display the response to the user via the conversation user interface 102-1 in step A9.

Figure 8B:
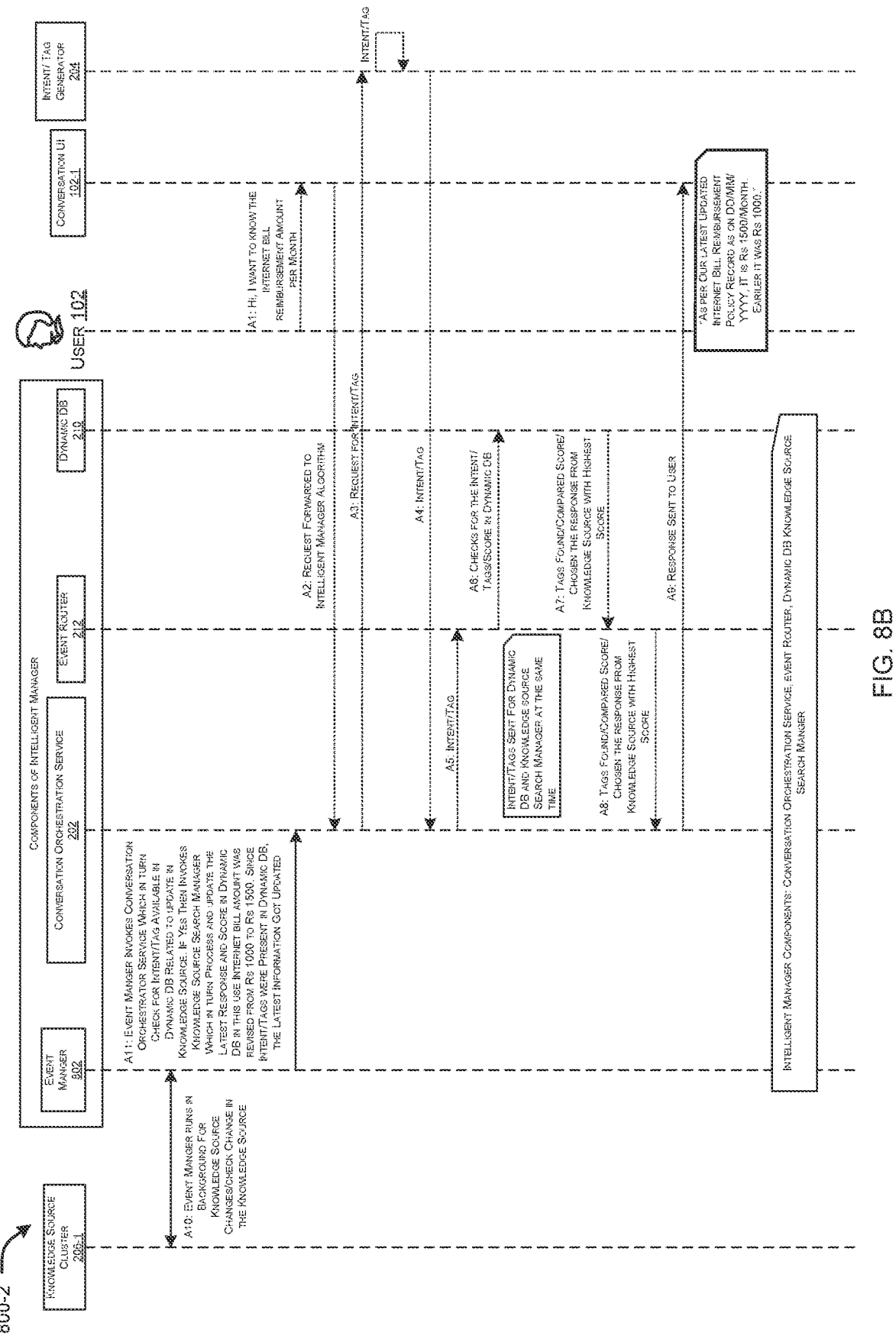
FIG. 8B illustrates an example sequence flow diagram corresponding to the conversation shown in FIG. 7B implementing parallel events, in accordance with embodiments of the present disclosure.

FIG. 8B illustrates an example sequence flow diagram 800-2 corresponding to the conversation shown in FIG. 7B implementing parallel events, in accordance with embodiments of the present disclosure. It may be appreciated that the description of FIG. 8B may correspond to the description of FIG. 8A.

It should be understood that the intelligent manager or system runs parallel events in the background. For example, at step A10, an event manager 802 may run in the background to check for an update in one of the knowledge sources 206-1. If there is an update of information in the knowledge sources 206-1, at step A11, the event manager 802 may invoke the conversation orchestration service engine 202, which in turn may check for an intent and/or tag associated with the updated information in the database 210. If the intent and/or tag is present in the database 210, the conversation orchestration service engine 202 may invoke a knowledge source search engine 206, which in turn may process and update the latest information, i.e., response and score in the database 210.

Use Case 2—Food Ordering Service

Figure 9B:
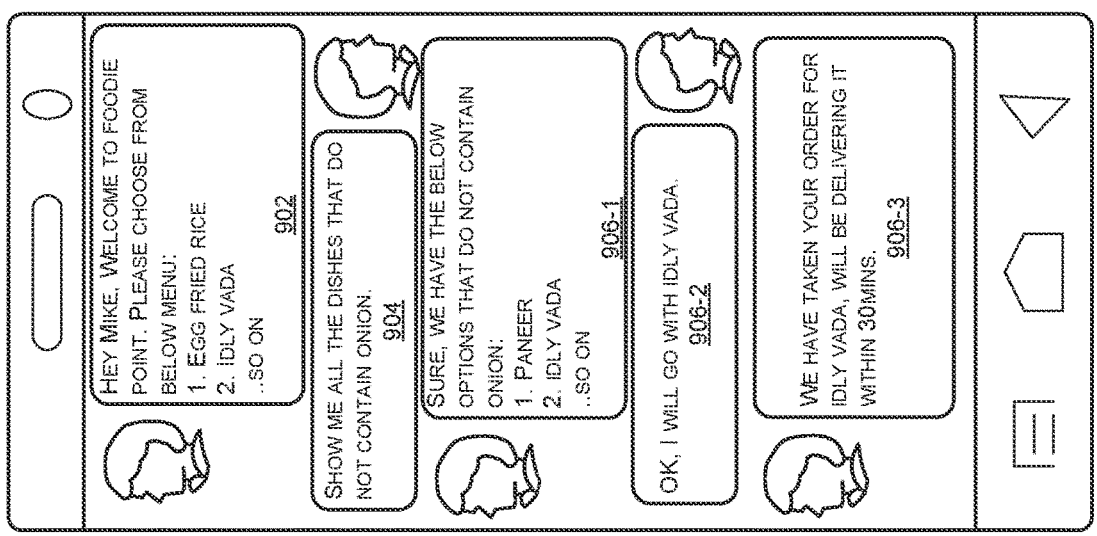
FIGS. 9A-9B illustrate example representations 900 of a conversation between a user and a chatbot implementation of the disclosed systems, in accordance with embodiments of the present disclosure.
Figure 9A:
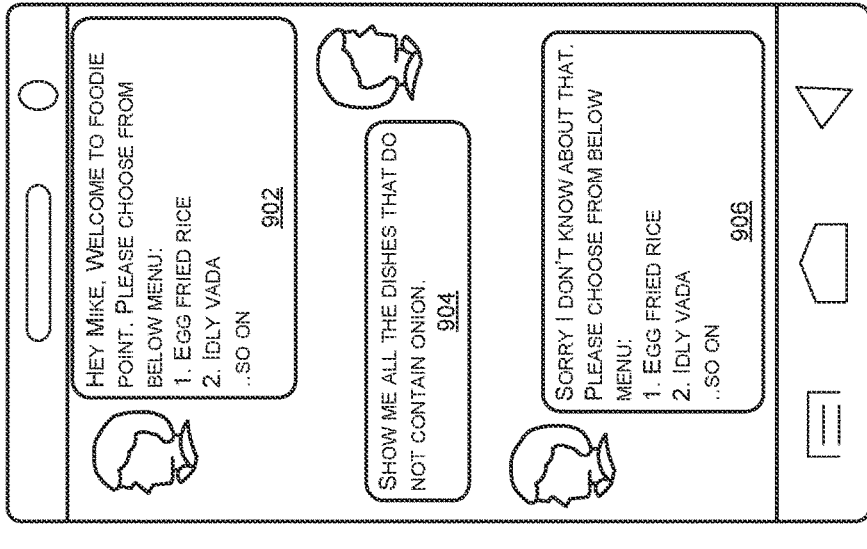

FIGS. 9A-9B illustrate example representations 900 of conversation between a user and chatbot a chatbot implementation of the disclosed systems. In particular, FIG. 9A illustrates an example representation of messages 902, 904, and 906 shared between the user and the chatbot conventionally. FIG. 9B illustrates an example representation of messages 902, 904, 906-1, 906-2, and 906-3 shared between the user and the proposed intelligent manager or system. This will be further explained in detail with respect to FIGS. 10A and 10B.

Figure 10A:
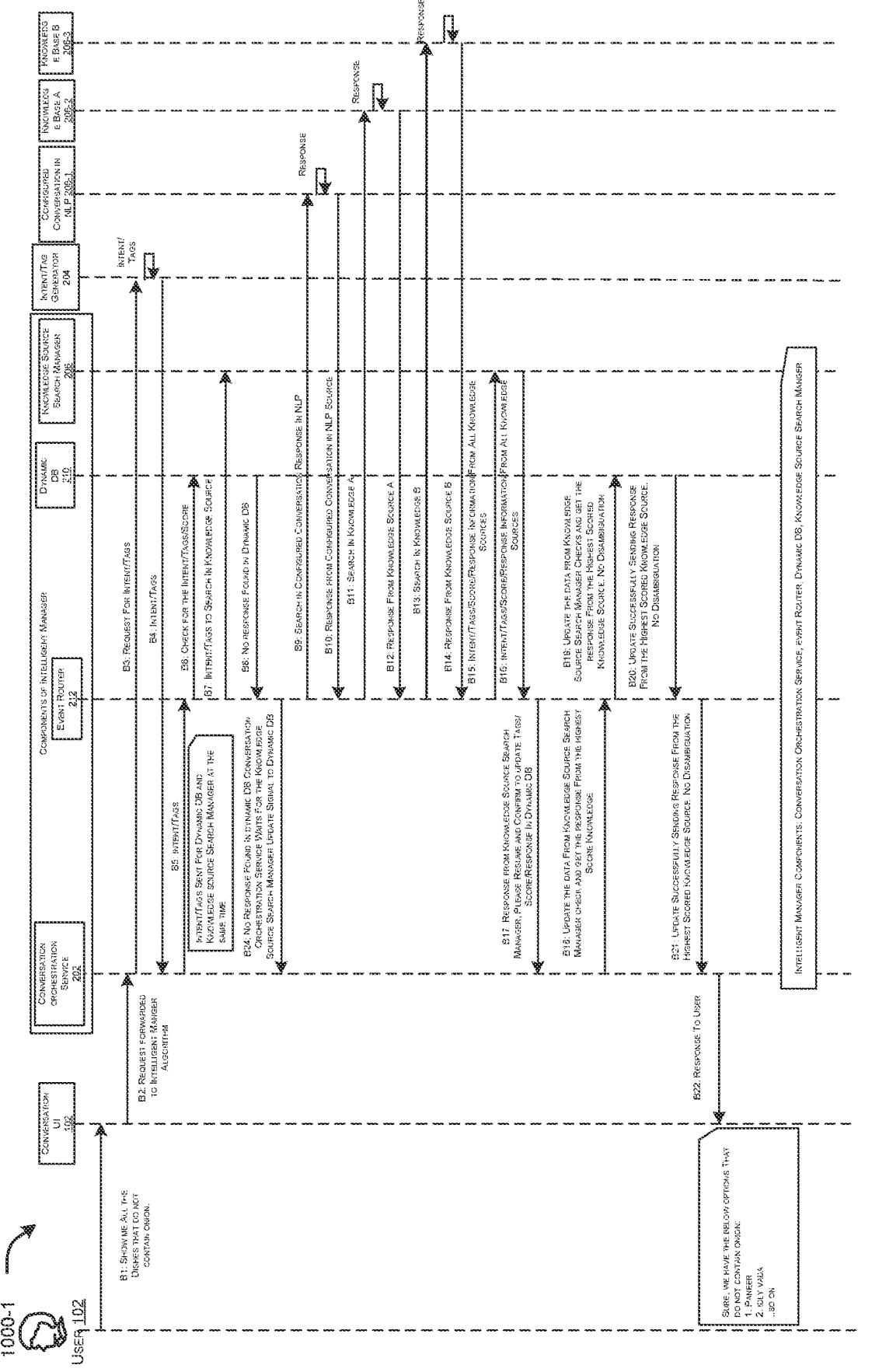
FIG. 10A illustrates an example sequence flow diagram corresponding to the conversation shown in FIG. 9B, in accordance with embodiments of the present disclosure.

FIG. 10A illustrates an example sequence flow diagram 1000-1 corresponding to the conversation shown in FIG. 9B, in accordance with embodiments of the present disclosure. It may be appreciated that like reference numerals are used for like components explained earlier.

Referring to FIG. 9A, the user 102 may initiate a conversation by sending a message request in step B1. At step B2, the conversation user interface 102-1 of the computing device (for example, the computing device 104) may send the message request to the intelligent manager or system (for example, 108). In an example embodiment, the conversation user interface 102-1 may send the message request to the conversation orchestration service engine 202.

At step B3, the conversation orchestration service engine 202 may send a request for intent and/or tags to the intent and tag generator 204. In an example embodiment, the conversation orchestration service engine 202 may send the message request to the intent and tag generator 204. The intent and tag generator 204 may generate an intent and/or tags associated with the message request, and provide the generated intent and/or tags to the conversation orchestration service engine 202 in step B4.

At step B5, the conversation orchestration service engine 202 may send the generated intent and/or tags to the event routing engine 212 to trigger a search event. At step B6, the event routing engine 212 may transmit a search query for the generated intent and/or tags to the database 210 in order to get a pre-stored response. Simultaneously, at step B7, the event routing engine 212 may transmit a search query to a knowledge source search engine 206 in order to get a predicted response. At step B8, the event routing engine 212 may determine that the generated intent and/or tag does not exist in the database 210, and hence, no pre-stored response is available. At step B24, the conversation orchestration service engine 202 may wait for a response from the knowledge source search engine 206.

At step B9, the event routing engine 212 may transmit a search query to the configured knowledge source 206-1, and at step B10, the evet routing engine 212 may receive a predicted response from the configured knowledge source 206-1. Similarly, at step B11, the event routing engine 212 may transmit a search query for a predicted response for the intent and/or tag to the knowledge source A 206-2, and at step B12, the event routing engine 212 may receive a predicted response from the knowledge source A 206-2. Likewise, at step B13, the event routing engine 212 may transmit a search query for a predicted response for the intent and/or tag to the knowledge source B 206-3, and at step B14, the event routing engine 212 may receive a predicted response from the knowledge source B 206-3.

At step B15, the knowledge source search engine 206 may receive the predicted response(s) along with prediction score and respective knowledge source information from the event routing engine 212. Further, the conversation orchestration service engine 202 may receive this information at step B17 via the event routing engine 212 (step B16).

At step B18, the conversation orchestration service engine 202 may update the information in the database 210. In particular, at step B19, the database 210 may receive the updated information from the conversation orchestration service engine 202 via the event routing engine 212. At step B20, the database 210 may send a response based on a scoring model to the event routing engine 212. In an example embodiment, the database 210 may send a response with the highest score to the event routing engine 212, and at step B21, the event routing engine 212 may forward the response to the conversation orchestration service engine 202. Finally, at step B22, the conversation user interface 102-1 may display the response to the user 102.

It should be understood that the intelligent manager or system runs parallel events in the background, and facilitates providing a most suitable response to the user.

Figure 10B:
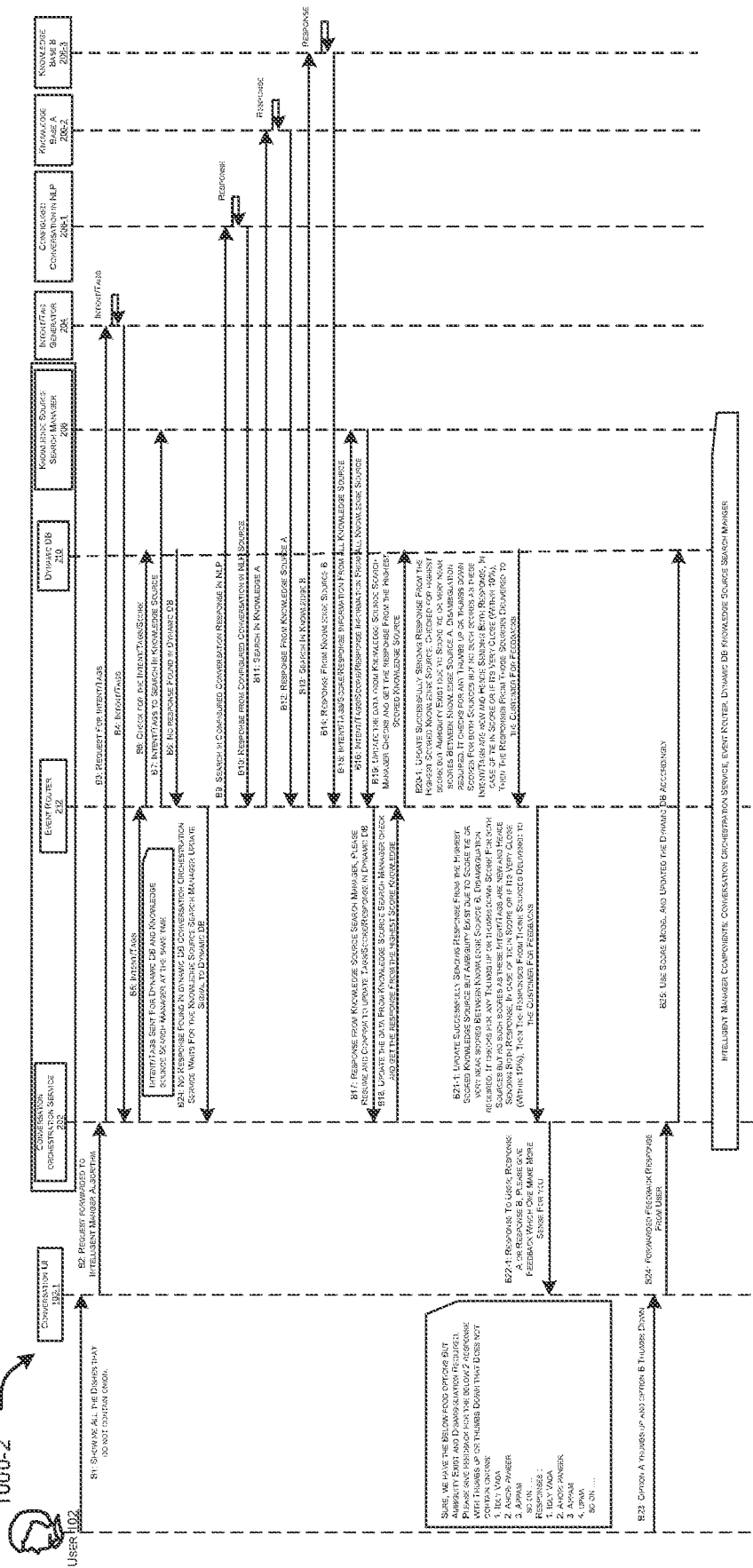
FIG. 10B illustrates an example sequence flow diagram corresponding to FIG. 10A in case of an ambiguity in determining a response during the conversation shown in FIG. 9B, in accordance with embodiments of the present disclosure.

FIG. 10B illustrates an example sequence flow diagram 1000-2 corresponding to FIG. 10A in case of an ambiguity in determining a response, in accordance with embodiments of the present disclosure. It may be appreciated that the description of FIG. 10B may correspond to the description of FIG. 10A.

Referring to FIG. 10B, in case of an ambiguity between scores associated with responses stored at the database 210, the event routing engine 212 and/or the conversation orchestration service engine 202 may compare a feedback score associated with each of those responses. In an example embodiment, the feedback score may include, but not be limited to, thumbs up (Tu) and thumbs down (Td) parameters. In a scenario when the feedback score for the responses does not exist, the event routing engine 212 may receive multiple responses from the database 210 at step B20-1. These multiple responses may have a tie in their scores or very close scores, for example, with a deviation of 5% to 10% with respect to each other.

At step B21-1, the conversation orchestration service engine 202 may receive the multiple responses from the event routing engine 212. In an example embodiment, at step B22-1, the conversation orchestration service engine 202 may send the multiple responses along with a request for feedback for each of the responses to the conversation user interface 102-1. Based on the responses received, for example, response A and response B, the user 102 may provide a feedback for each response in step B23. As an example, but not limitation, the user 102 may provide a positive feedback (i.e., thumbs up) for response A and a negative feedback (i.e., thumbs down) for response B). At step B24, the conversation user interface 102-1 may forward the feedback to the conversation orchestration service engine 202. In accordance with embodiments of the present disclosure, the conversation orchestration service engine 202 uses a scoring model to determine the feedback score for each of the responses. In an example embodiment, a scoring engine may be used to determine the feedback score based on a feedback scoring model, described herein.

At step B25, the conversation orchestration service engine 202 may update the database 210 with the feedback score.

Therefore, the disclosed system facilitates the database 210 to be updated dynamically, thereby improving the accuracy of responses provided to a user.

A person of ordinary skill in the art will readily ascertain that the illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 11:
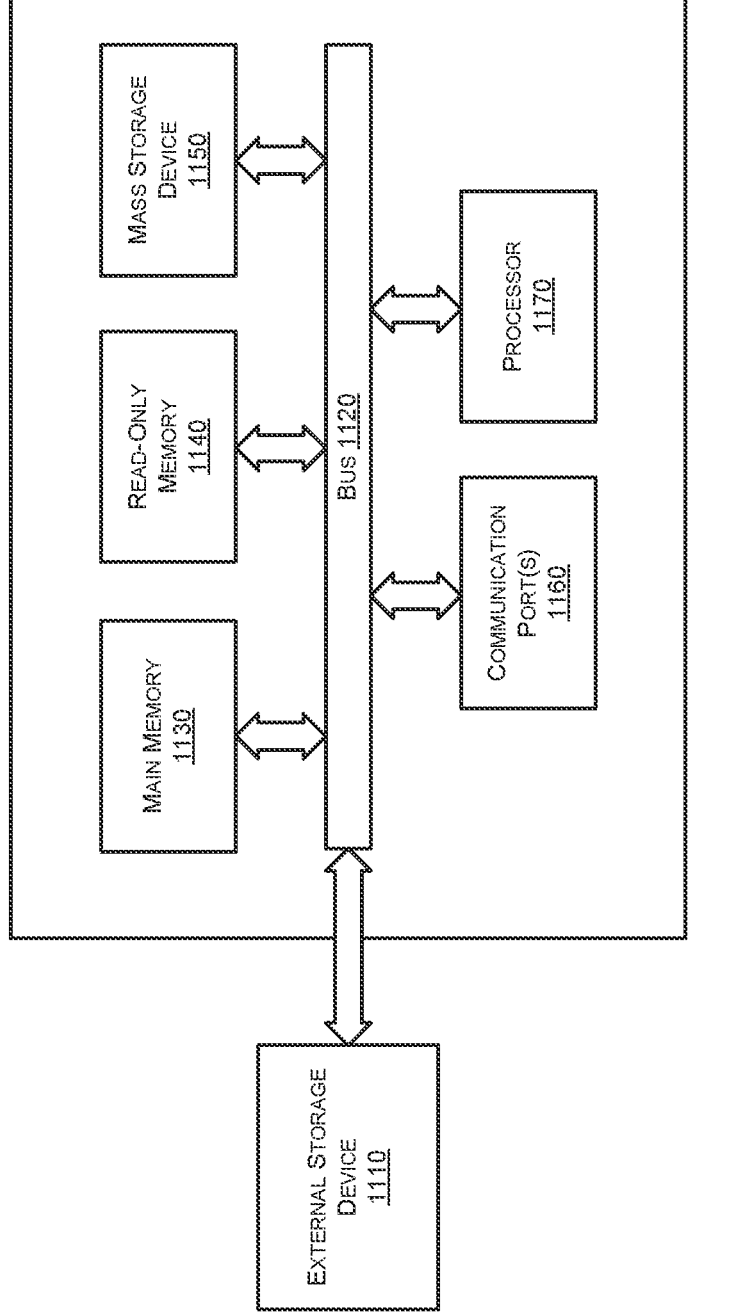
FIG. 11 illustrates a computer system in which or with which embodiments of the present disclosure may be implemented.

FIG. 11 illustrates a computer system 1100 in which or with which embodiments of the present disclosure may be implemented. In particular, the disclosed system, i.e., an intelligent manager may be implemented as the computer system 1100.

Referring to FIG. 11, the computer system 1100 may include an external storage device 1110, a bus 1120, a main memory 1130, a read-only memory 1140, a mass storage device 1150, communication port(s) 1160, and a processor 1170. A person skilled in the art will appreciate that the computer system 1100 may include more than one processor and communication ports. The communication port(s) 1160 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 1160 may be chosen depending on a network, such a Local Area Network (LAN), Wide Area Network (WAN), or any network to which the computer system 1100 connects. The main memory 1130 may be random access memory (RAM), or any other dynamic storage device commonly known in the art. The read-only memory 1140 may be any static storage device(s) including, but not limited to, a Programmable Read Only Memory (PROM) chips for storing static information e.g., start-up or basic input/output system (BIOS) instructions for the processor 1170. The mass storage device 1150 may be any current or future mass storage solution, which may be used to store information and/or instructions. The bus 1120 communicatively couples the processor 1170 with the other memory, storage, and communication blocks. The bus 1120 can be, e.g. a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 1170 to the computer system 1100. Optionally, operator and administrative interfaces, e.g. a display, keyboard, and a cursor control device, may also be coupled to the bus 1120 to support direct operator interaction with the computer system 1100. Other operator and administrative interfaces may be provided through network connections connected through the communication port(s) 1160. In no way should the aforementioned exemplary computer system limit the scope of the present disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system, comprising: a processor, Anda memory coupled to the processor, wherein the memory comprises processor-executable instructions, which on execution, cause the processor to: receive, by a conversation orchestration engine which is an artificial intelligence engine, a message request from a computing device via a network in a secure manner, wherein the computing device is communicatively coupled to the network; securely manage, by the conversation orchestration engine, connections and route messages between the system and the computing device generate, by an intent and tag generator, an intent and a tag associated with the message request based on a pre-processing of the message request, wherein the conversation orchestration engine is to obtain the generated intent associated with the message request from the intent and tag generator; concurrently transmit, by the conversation orchestration engine using the network: a query to a database for a prestored response to the message request based on the generated intent, and the generated intent to a knowledge source searcher, wherein the knowledge source searcher asynchronously queries one or more knowledge sources for a predicted response to the message request; based on the concurrent transmission, receive, by the conversation orchestration engine, the prestored response from the database and the predicted response from the knowledge source searcher; determine, by the conversation orchestration engine, a response to the message request, from at least one of the prestored response and the predicted response, based on a scoring model; and transmit, by the conversation orchestration engine, using the network, the determined response to the computing device.

2. The system of claim 1, wherein the scoring model calculates a score associated with:
    a knowledge source for the prestored response, and
    a knowledge source for the predicted response.

3. The system of claim 2, wherein the determination of the response comprises:
    comparison of the scores associated with each of the prestored response and the predicted response;
    selection of a candidate response having a highest score among the scores associated with each of the prestored response and the predicted response; and
    transmission of the candidate response as the determined response to the computing device.

4. The system of claim 1, wherein the message request corresponds to a conversation initiated by a user using computing device.

5. The system of claim 1, wherein the pre-processing of the message request to generate the intent comprises at least one of: generating keywords by removing stop words from the message request and generating synonyms for the keywords.

6. The system of claim 1, wherein the database comprises:
    a number of prestored intents,
    wherein, for each of the number of prestored intents, the database comprises:
        a prestored response;
        a knowledge source of the one or more knowledge sources associated with the prestored response; and
        a score associated with the knowledge source.

7. The system of claim 2, wherein the scoring model computes:
    a prediction score for each of the one or more knowledge sources; and
    a feedback score based on a feedback from a user of the computing device.

8. The system of claim 3, wherein the memory comprises processor-executable instructions, which on execution, further cause the processor to dynamically update the database based on at least one of the predicted response and the determined response.

9. The system of claim 8, wherein the memory comprises processor-executable instructions, which on execution, further cause the processor to dynamically update the score associated with the candidate response in the database.

10. The system of claim 1, wherein the memory comprises processor-executable instructions, which on execution, further cause the processor to dynamically update the database for each message request received from a user of the computing device.

11. The system of claim 1, wherein a prediction score is associated with the predicted response based on a natural language processing model, and wherein the memory comprises processor-executable instructions, which on execution, further cause the processor to:
    receive the prediction score associated with the predicted response from the knowledge source searcher; and
    dynamically update the database based on the predicted response and the prediction score.

12. The system of claim 1, wherein an update of information stored in the one or more knowledge sources causes the processor to:
    query, by the conversation orchestration engine, the database via the network for a first tag associated with the updated information;
    transmit, by the conversation orchestration engine, via the network, the first tag to the knowledge source searcher to obtain a predicted response and a prediction score for the first tag from each of the one or more knowledge sources;

receive, by the conversation orchestration engine, the predicted response and the prediction score for the first tag, via the network; and dynamically update the database, by the conversation orchestration engine, based on the received predicted response and the prediction score for the first tag.

13. A method, comprising: receiving, by a processor, using a conversation orchestration engine which is an artificial intelligence engine, a message request from a computing device via a network in a secure manner, wherein the computing device is communicatively coupled to the network; securely manage, by the conversation orchestration engine, connections and route messages between the system and the computing device; generating, by the processor, using an intent and tag generator, an intent and a tag associated with the message request based on pre-processing the message request, wherein the conversation orchestration engine is to obtain the generated intent and tag associated with the message request from the intent and tag generator; concurrently transmitting using the network, by the processor using the conversation orchestration engine: a query to a database for a prestored response to the message request based on the generated intent; and the generated intent to a knowledge source searcher, wherein the knowledge source searcher asynchronously queries one or more knowledge sources for a predicted response to the message request; based on concurrently transmitting, receiving, by the processor using the conversation orchestration engine, the prestored response from the database and the predicted response from the knowledge source searcher; determining, by the processor using the conversation orchestration engine, a response to the message request, from at least one of the prestored response and the predicted response, based on a score associated with: a knowledge source for the prestored response, and a knowledge source for the predicted response, wherein the determining comprises: comparing, by the processor, the scores associated with the prestored response and the predicted response; and selecting, by the processor, a candidate response having a highest score among the scores associated with each of the prestored response and the predicted response; and transmitting, via the network by the processor using the conversation orchestration engine, the candidate response as the determined response to the computing device.

14. The method of claim 13, wherein the database comprises:

a number of prestored intents, wherein, for each of the number of prestored intents, the database comprises:

a prestored response;

a knowledge source of the one or more knowledge sources associated with the prestored response; and a score associated with to the knowledge source.

15. The method of claim 13, wherein the scores associated with each of the prestored response and the predicted response are based on a scoring model, and wherein the scoring model computes:

a prediction score for each of the one or more knowledge sources; and a feedback score based on a feedback from a user of the computing device.

16. The method of claim 13, further comprising dynamically updating the database based on at least one of the predicted response and the determined response.

17. The method of claim 16, further comprising dynamically updating the score associated with the candidate response in the database.

18. The method of claim 15, wherein a prediction score is associated with the predicted response based on a natural language processing model, and wherein the method further comprises:

receiving, by the conversation orchestration engine, the prediction score associated with the predicted response from the knowledge source searcher via the network; and dynamically updating the database based on the predicted response and the prediction score.

19. The method of claim 15, wherein in case of an update of information stored in the one or more knowledge sources, the method comprises:

querying, by the conversation orchestration engine, via the network, the database for a first tag associated with the updated information;

transmitting, by the conversation orchestration engine, via the network, the first tag to the knowledge source searcher to obtain a predicted response and a prediction score for the first tag from each of the one or more knowledge sources;

receiving, by the conversation orchestration engine, the predicted response and the prediction score for the first tag; and dynamically updating the database, by the conversation orchestration engine, based on the received predicted response and the prediction score for the first tag.

20. A non-transitory computer-readable medium comprising machine- readable instructions that are executable by a processor to: receive, by a conversation orchestration engine which is an artificial intelligence engine, a message request from a computing device via a network in a secure manner, wherein the computing device is communicatively coupled to the network; securely manage, by the conversation orchestration engine, connections and route messages between the system and the computing device; generate, by an intent and tag generator, an intent and tag associated with the message request based on a pre-processing of the message request; concurrently transmit using the network: a query to a database for a prestored response to the message request based on the generated intent; and the generated intent to a knowledge source searcher, wherein the knowledge source searcher asynchronously queries one or more knowledge sources for a predicted response to the message request; based on the concurrent transmission, receive, by the conversation orchestration engine, the prestored response from the database and the predicted response from the knowledge source searcher;

determine, by the conversation orchestration engine, the response to the message request, from at least one of the prestored response and the predicted response based on a scoring model; and transmit, by the conversation orchestration engine, via the network, the determined response to the computing device.

* * * * *